(12) United States Patent
Nam et al.

(10) Patent No.: US 12,231,679 B2
(45) Date of Patent: Feb. 18, 2025

(54) INTRA BLOCK CODING-BASED VIDEO OR IMAGE CODING

(71) Applicant: LG ELECTRONICS INC., Seoul (KR)

(72) Inventors: Junghak Nam, Seoul (KR); Hyeongmoon Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 306 days.

(21) Appl. No.: 17/431,777

(22) PCT Filed: Mar. 4, 2020

(86) PCT No.: PCT/KR2020/003045
§ 371 (c)(1),
(2) Date: Aug. 18, 2021

(87) PCT Pub. No.: WO2020/180100
PCT Pub. Date: Sep. 10, 2020

(65) Prior Publication Data
US 2022/0141485 A1 May 5, 2022

Related U.S. Application Data

(60) Provisional application No. 62/813,731, filed on Mar. 4, 2019.

(51) Int. Cl.
*H04N 19/593* (2014.01)
*H04N 19/105* (2014.01)
(Continued)

(52) U.S. Cl.
CPC ......... *H04N 19/593* (2014.11); *H04N 19/105* (2014.11); *H04N 19/109* (2014.11);
(Continued)

(58) Field of Classification Search
CPC .. H04N 19/593; H04N 19/139; H04N 19/176; H04N 19/52; H04N 19/70; H04N 19/132
See application file for complete search history.

(56) References Cited

U.S. PATENT DOCUMENTS 9,661,338 B2    5/2017  Karczewicz et al.
11,412,211 B2 * 8/2022  Lee .................. H04N 19/52
(Continued)

FOREIGN PATENT DOCUMENTS

KR    20150145688 A    12/2015
KR    20160135306 A    11/2016
(Continued)

OTHER PUBLICATIONS

D. Flynn et al., "High Efficiency Video Coding (HEVC) Range Extensions text specification: Draft 6", Joint Collaborative Team on Video Coding (JCT-VC) of ITU-T SG 16 WP 3 and ISO/IEC JTC 1/SC 29/WG 11, Jan. 9-17, 2014, JCTVC-P1005_v4, XP030115878.
(Continued)

*Primary Examiner* — Kathleen V Nguyen
(74) *Attorney, Agent, or Firm* — Bryan Cave Leighton Paisner LLP

(57) ABSTRACT

According to the present disclosure of the present document, prediction can be performed on the basis of information related to the maximum number of block vector candidates included in a merge candidate list for the IBC merge mode, and thus information for IBC, which is distinguished from information used in inter prediction, can be signaled separately, and the efficiency of screen content coding (SCC) can be increased.

15 Claims, 13 Drawing Sheets

(51) Int. Cl.
  *H04N 19/109* (2014.01)
  *H04N 19/11* (2014.01)
  *H04N 19/132* (2014.01)
  *H04N 19/139* (2014.01)
  *H04N 19/172* (2014.01)
  *H04N 19/176* (2014.01)
  *H04N 19/196* (2014.01)
  *H04N 19/52* (2014.01)

(52) U.S. Cl.
  CPC ........... *H04N 19/11* (2014.11); *H04N 19/132* (2014.11); *H04N 19/139* (2014.11); *H04N 19/172* (2014.11); *H04N 19/176* (2014.11); *H04N 19/196* (2014.11); *H04N 19/52* (2014.11)

(56) References Cited

U.S. PATENT DOCUMENTS

| | | | |
|---|---|---|---|
| 2012/0134412 A1 | 5/2012 | Shibahara et al. | |
| 2015/0264386 A1 | 9/2015 | Pang et al. | |
| 2015/0271515 A1* | 9/2015 | Pang | H04N 19/70 375/240.16 |
| 2017/0118484 A1* | 4/2017 | Maeda | H04N 19/557 |
| 2017/0155914 A1* | 6/2017 | Jeon | H04N 19/52 |
| 2022/0078438 A1* | 3/2022 | Nakamura | H04N 19/70 |
| 2023/0027997 A1* | 1/2023 | Deshpande | H04N 19/70 |

FOREIGN PATENT DOCUMENTS

| | | |
|---|---|---|
| WO | 20150143395 A1 | 9/2015 |
| WO | 2015194913 A1 | 12/2015 |

OTHER PUBLICATIONS

B. Bross et al., "Versatile Video Coding (Draft 4)", Joint Video Experts Team (JVET) of ITU-T SG 16 WP 3 and ISO/IEC JTC 1/SC 29/WG 11, Jan. 9-18, 2019, JVET-M1001-v5, XP030202598.

J. Nam et al., "CE8-related: Signaling on maximum number of candidates for IBC merge mode", Joint Video Experts Team (JVET) of ITU-T SG 16 WP 3 and ISO/IEC JTC 1/SC 29/WG 11, Mar. 19-27, 2019, JVET-N0461, XP030203106.

M. Zhou, "CE13: Test results on maxNumMergeCand signaling and simplification of merge MVP list pruning process", Joint Collaborative Team on Video Coding (JCT-VC) of ITU-T SG16 WP3 and ISO/IEC JTC1/SC29/WG11, Nov. 19-30, 2011, JCTVC-G091, XP030229800.

Y. He et al., "Non-SCCE1: Improved intra block copy coding with block vector derivation", Joint Collaborative Team on Video Coding (JCT-VC) of ITU-T SG 16 WP 3 and ISO/IEC JTC 1/SC 29/WG 11, Jun. 30-Jul. 9, 2014, JCTVC-R0165, XP030240184.

* cited by examiner

INTRA BLOCK CODING-BASED VIDEO OR IMAGE CODING

CROSS-REFERENCE TO RELATED APPLICATION

This application is the National Stage filing under 35 U.S.C. 371 of International Application No. PCT/KR2020/003045, filed Mar. 4, 2020, which claims the benefit of U.S. Provisional Application No. 62/813,731, filed on Mar. 4, 2019, the contents of which are all hereby incorporated by reference herein in their entirety.

BACKGROUND OF THE DISCLOSURE

Field of the Disclosure

The present document relates to intra block coding (IBC) based video or image coding.

Related Art

Recently, demand for high-resolution, high-quality image/video such as 4K or 8K or higher ultra high definition (UHD) image/video has increased in various fields. As image/video data has high resolution and high quality, the amount of information or bits to be transmitted increases relative to the existing image/video data, and thus, transmitting image data using a medium such as an existing wired/wireless broadband line or an existing storage medium or storing image/video data using existing storage medium increase transmission cost and storage cost.

In addition, interest and demand for immersive media such as virtual reality (VR) and artificial reality (AR) content or holograms has recently increased and broadcasting for image/video is having characteristics different from reality images such as game images has increased.

Accordingly, a highly efficient image/video compression technology is required to effectively compress, transmit, store, and reproduce information of a high-resolution, high-quality image/video having various characteristics as described above.

In addition, there is a discussion on an intra block coding (IBC) technique in order to improve compression efficiency and increase coding efficiency for screen contents. In order to efficiently apply these techniques, there is a need for a method for efficiently signaling related information.

SUMMARY

According to an embodiment of the present document, a method and an apparatus for increasing image coding efficiency are provided.

According to an embodiment of the present document, an efficient filtering application method and apparatus are provided.

According to an embodiment of the present document, an efficient IBC application method and apparatus are provided.

According to an embodiment of the present document, a method and apparatus for signaling information on the maximum number of block vector candidates included in a candidate list for IBC are provided.

According to an embodiment of the present document, a method and an apparatus, for separately signaling information on the maximum number of block vector candidates included in the merge candidate list for the IBC merge and information on the maximum number of motion vector candidates included in the merge candidate list for the merge mode of the inter prediction, are provided.

According to an embodiment of the present document, a video/image decoding method performed by a decoding apparatus is provided.

According to an embodiment of the present document, a decoding apparatus for performing video/image decoding is provided.

According to an embodiment of the present document, a video/image encoding method performed by an encoding apparatus is provided.

According to an embodiment of the present document, an encoding apparatus for performing video/image encoding is provided.

According to one embodiment of the present document, there is provided a computer-readable digital storage medium in which encoded video/image information, generated according to the video/image encoding method disclosed in at least one of the embodiments of the present document, is stored.

According to an embodiment of the present document, there is provided a computer-readable digital storage medium in which encoded information or encoded video/image information, causing to perform the video/image decoding method disclosed in at least one of the embodiments of the present document by the decoding apparatus, is stored.

Advantageous Effects

According to an embodiment of the present document, overall image/video compression efficiency may be improved.

According to an embodiment of the present document, subjective/objective visual quality may be improved through efficient filtering.

According to an embodiment of the present document, a merge candidate list for IBC may be constructed.

According to an embodiment of the present document, information on the maximum number of candidates included in the merge candidate list for IBC may be signaled.

According to an embodiment of the present document, the degree of freedom for the codec may be increased and the efficiency of coding may be increased.

DESCRIPTION OF EXEMPLARY EMBODIMENTS

Figure 1:
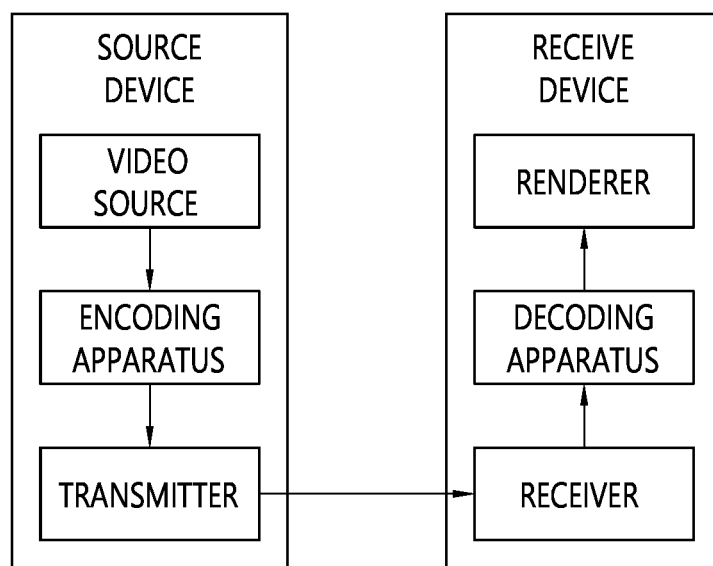
FIG. 1 illustrates an example of a video/image coding system to which the embodiments of the present document may be applied.

The present document may be modified in various forms, and specific embodiments thereof will be described and shown in the drawings. However, the embodiments are not intended for limiting the present document. The terms used in the following description are used to merely describe specific embodiments, but are not intended to limit the present document. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, each configuration in the drawings described in the present document is shown independently for the convenience of description regarding different characteristic functions, and does not mean that each configuration is implemented as separate hardware or separate software. For example, two or more components among each component may be combined to form one component, or one component may be divided into a plurality of components. Embodiments in which each component is integrated and/or separated are also included in the scope of the disclosure of the present document.

Hereinafter, examples of the present embodiment will be described in detail with reference to the accompanying drawings. In addition, like reference numerals are used to indicate like elements throughout the drawings, and the same descriptions on the like elements will be omitted.

FIG. 1 illustrates an example of a video/image coding system to which the embodiments of the present document may be applied.

Referring to FIG. 1, a video/image coding system may include a first device (a source device) and a second device (a reception device). The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compaction and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

The present document relates to video/image coding. For example, a method/embodiment disclosed in the present document may be applied to a method disclosed in the versatile video coding (VVC) standard, the essential video coding (EVC) standard, the AOMedia Video 1 (AV1) standard, the 2nd generation of audio video coding standard (AVS2) or the next generation video/image coding standard (e.g., H.267, H.268, or the like).

The present document suggests various embodiments of video/image coding, and the above embodiments may also be performed in combination with each other unless otherwise specified.

In the present document, a video may refer to a series of images over time. A picture generally refers to the unit representing one image at a particular time frame, and a slice/tile refers to the unit constituting a part of the picture in terms of coding. A slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture. A tile may be partitioned into a multiple bricks, each of which may be constructed with one or more CTU rows within the tile. A tile that is not partitioned into multiple bricks may also be referred to as a brick. A brick scan may represent a specific sequential ordering of CTUs partitioning a picture, wherein the CTUs may be ordered in a CTU raster scan within a brick, and bricks within a tile may be ordered consecutively in a raster scan of the bricks of the tile, and tiles in a picture may be ordered consecutively in a raster scan of the tiles of the picture. A tile is a rectangular region of CTUs within a particular tile column and a particular tile row in a picture.

The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consists of either a number of complete tiles or only a consecutive sequence of complete bricks of one tile. In the present document, a tile group and a slice may be used in place of each other. For example, in the present document, a tile group/tile group header may be referred to as a slice/slice header.

Meanwhile, one picture may be divided into two or more subpictures. A subpicture may be a rectangular region of one or more slices within a picture.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows. Alternatively, the sample may mean a pixel value in the spatial domain, and when such a pixel value is transformed to the frequency domain, it may mean a transform coefficient in the frequency domain.

In the present document, "A or B" may mean "only A", "only B" or "both A and B". In other words, "A or B" in the present document may be interpreted as "A and/or B". For example, in the present document "A, B or C (A, B or C)" means "only A", "only B", "only C", or "any combination of A, B and C".

A slash (/) or comma (comma) used in the present document may mean "and/or". For example, "A/B" may mean "A and/or B". Accordingly, "A/B" may mean "only A", "only B", or "both A and B". For example, "A, B, C" may mean "A, B, or C".

In the present document, "at least one of A and B" may mean "only A", "only B" or "both A and B". Also, in the present document, the expression "at least one of A or B" or "at least one of A and/or B" may be interpreted the same as "at least one of A and B".

Also, in the present document, "at least one of A, B and C" means "only A", "only B", "only C", or "any combination of A, B and C". Also, "at least one of A, B or C" or "at least one of A, B and/or C" may mean "at least one of A, B and C".

Also, parentheses used in the present document may mean "for example". Specifically, when "prediction (intra prediction)" is indicated, "intra prediction" may be proposed as an example of "prediction". In other words, "prediction" in the present document is not limited to "intra prediction", and "intra prediction" may be proposed as an example of "prediction". Also, even when "prediction (i.e., intra prediction)" is indicated, "intra prediction" may be proposed as an example of "prediction".

Technical features that are individually described in one drawing in the present document may be implemented individually or simultaneously.

Figure 2:
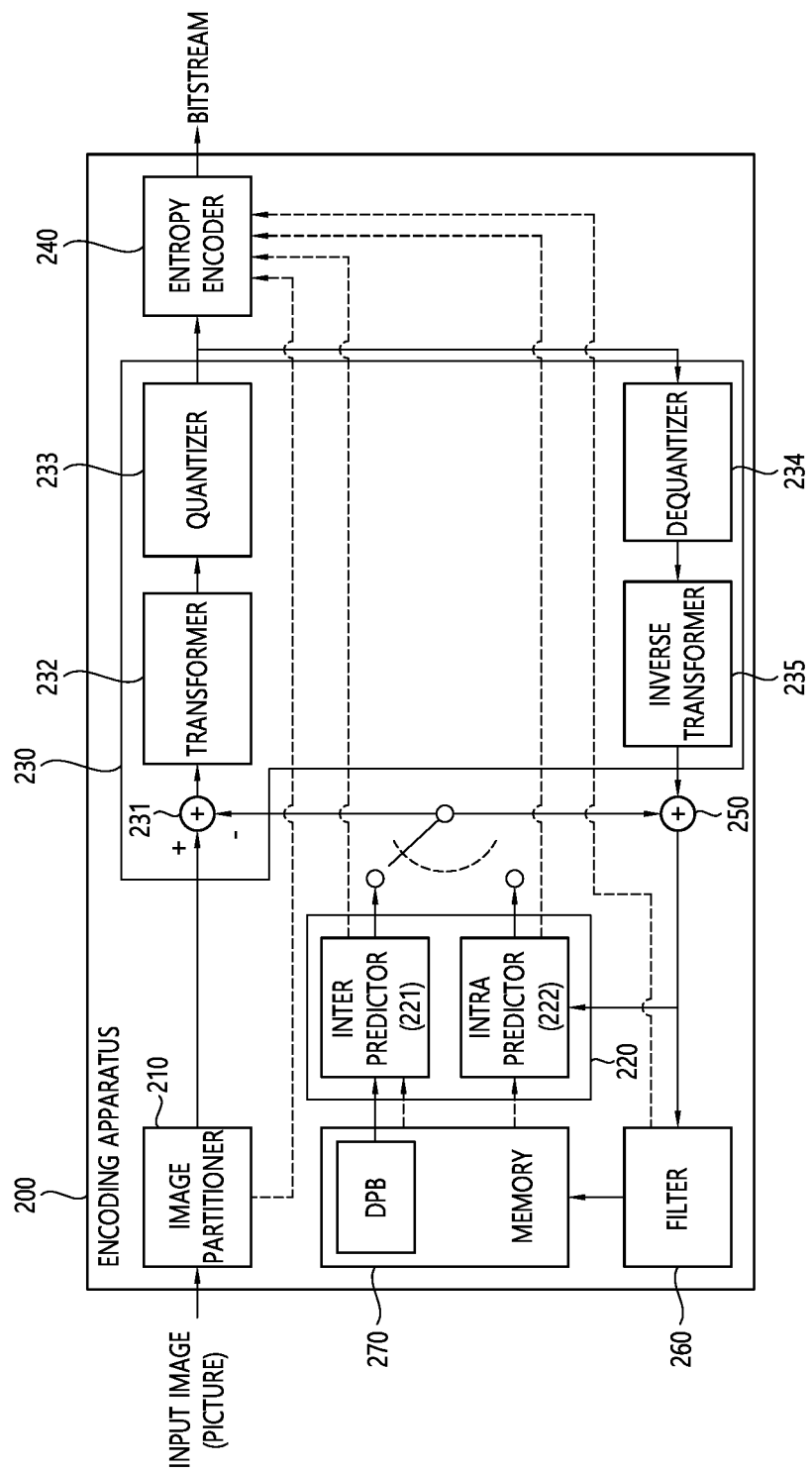
FIG. 2 is a diagram schematically illustrating a configuration of a video/image encoding apparatus to which the embodiments of the present document may be applied.

FIG. 2 is a diagram schematically illustrating a configuration of a video/image encoding apparatus to which the embodiments of the present document may be applied. Hereinafter, what is referred to as the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. An encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), A graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus 300 may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
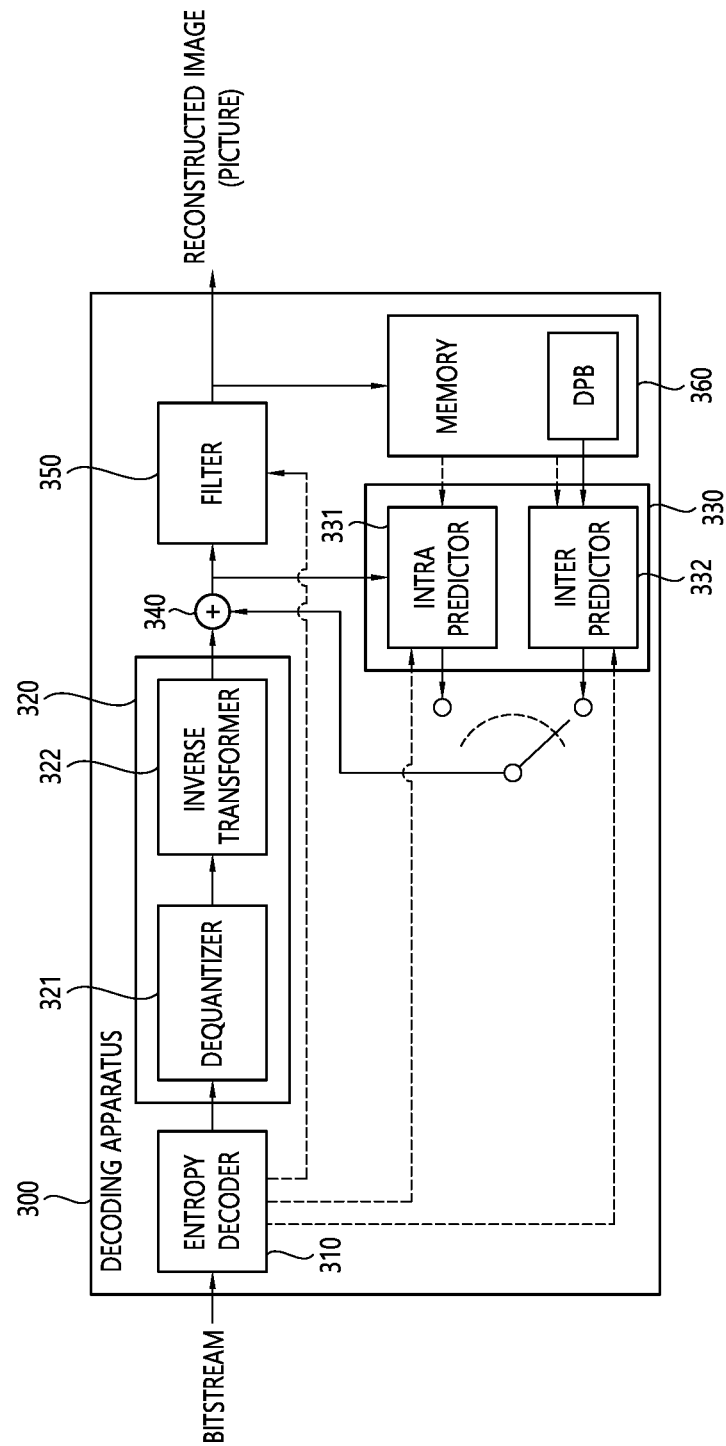
FIG. 3 is a diagram schematically illustrating a configuration of a video/image decoding apparatus to which the embodiments of the present document may be applied.

FIG. 3 is a schematic diagram illustrating a configuration of a video/image decoding apparatus to which the embodiment(s) of the present disclosure may be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. A decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present document, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

As described above, in video coding, prediction is performed to increase compression efficiency. Through this, it is possible to generate a predicted block including prediction samples for a current block, which is a block to be coded. Here, the predicted block includes prediction samples in a spatial domain (or pixel domain) The predicted block is derived equally from the encoding device and the decoding device, and the encoding device decodes information (residual information) on the residual between the original block and the predicted block, not the original sample value of the original block itself. By signaling to the device, image coding efficiency can be increased. The decoding apparatus may derive a residual block including residual samples based on the residual information, and generate a reconstructed block including reconstructed samples by summing the residual block and the predicted block, and generate a reconstructed picture including reconstructed blocks.

The residual information may be generated through transformation and quantization processes. For example, the encoding apparatus may derive a residual block between the original block and the predicted block, and perform a transform process on residual samples (residual sample array) included in the residual block to derive transform coefficients, and then, by performing a quantization process on the transform coefficients, derive quantized transform coefficients to signal the residual related information to the decoding apparatus (via a bitstream). Here, the residual information may include location information, a transform technique, a transform kernel, and a quantization parameter, value information of the quantized transform coefficients etc. The decoding apparatus may perform dequantization/inverse transformation process based on the residual information and derive residual samples (or residual blocks). The decoding apparatus may generate a reconstructed picture based on the predicted block and the residual block. The encoding apparatus may also dequantize/inverse transform the quantized transform coefficients for reference for inter prediction of a later picture to derive a residual block, and generate a reconstructed picture based thereon. In the present document, at least one of quantization/dequantization and/or transform/inverse transform may be omitted. When the quantization/dequantization is omitted, the quantized transform coefficient may be referred to as a transform coefficient. When the transform/inverse transform is omitted, the transform coefficients may be called coefficients or residual coefficients, or may still be called transform coefficients for uniformity of expression. In the present document, a quantized transform coefficient and a transform coefficient may be referred to as a transform coefficient and a scaled transform coefficient, respectively. In this case, the residual information may include information on transform coefficient(s), and the information on the transform coefficient(s) may be signaled through residual coding syntax. Transform coefficients may be derived based on the residual information (or information on the transform coefficient(s)), and scaled transform coefficients may be derived through inverse transform (scaling) on the transform coefficients. Residual samples may be derived based on an inverse transform (transform) of the scaled transform coefficients. This may be applied/expressed in other parts of the present document as well.

Intra prediction may refer to prediction that generates prediction samples for the current block based on reference samples in a picture to which the current block belongs (hereinafter, referred to as a current picture). When intra prediction is applied to the current block, neighboring reference samples to be used for intra prediction of the current block may be derived. The neighboring reference samples of the current block may include samples adjacent to the left boundary of the current block having a size of nW×nH and a total of 2×nH samples neighboring the bottom-left, samples adjacent to the top boundary of the current block and a total of 2×nW samples neighboring the top-right, and one sample neighboring the top-left of the current block. Alternatively, the neighboring reference samples of the current block may include a plurality of upper neighboring samples and a plurality of left neighboring samples. In addition, the neighboring reference samples of the current block may include a total of nH samples adjacent to the right boundary of the current block having a size of nW×nH, a total of nW samples adjacent to the bottom boundary of the current block, and one sample neighboring (bottom-right) neighboring bottom-right of the current block.

However, some of the neighboring reference samples of the current block may not be decoded yet or available. In this case, the decoder may configure the neighboring reference samples to use for prediction by substituting the samples that are not available with the available samples. Alternatively, neighboring reference samples to be used for prediction may be configured through interpolation of the available samples.

When the neighboring reference samples are derived, (i) the prediction sample may be derived based on the average or interpolation of neighboring reference samples of the current block, and (ii) the prediction sample may be derived based on the reference sample present in a specific (prediction) direction for the prediction sample among the periphery reference samples of the current block. The case of (i) may be called non-directional mode or non-angular mode and the case of (ii) may be called directional mode or angular mode.

Furthermore, the prediction sample may also be generated through interpolation between the second neighboring sample and the first neighboring sample located in a direction opposite to the prediction direction of the intra prediction mode of the current block based on the prediction sample of the current block among the neighboring reference samples. The above case may be referred to as linear interpolation intra prediction (LIP). In addition, chroma prediction samples may be generated based on luma samples using a linear model. This case may be called LM mode.

In addition, a temporary prediction sample of the current block may be derived based on filtered neighboring reference samples, and at least one reference sample derived according to the intra prediction mode among the existing neighboring reference samples, that is, unfiltered neighboring reference samples, and the temporary prediction sample may be weighted-summed to derive the prediction sample of the current block. The above case may be referred to as position dependent intra prediction (PDPC).

In addition, a reference sample line having the highest prediction accuracy among the neighboring multi-reference sample lines of the current block may be selected to derive the prediction sample by using the reference sample located in the prediction direction on the corresponding line, and then the reference sample line used herein may be indicated (signaled) to the decoding apparatus, thereby performing intra-prediction encoding. The above case may be referred to as multi-reference line (MRL) intra prediction or MRL based intra prediction.

In addition, intra prediction may be performed based on the same intra prediction mode by dividing the current block into vertical or horizontal subpartitions, and neighboring reference samples may be derived and used in the subpartition unit. That is, in this case, the intra prediction mode for the current block is equally applied to the subpartitions, and the intra prediction performance may be improved in some cases by deriving and using the neighboring reference samples in the subpartition unit. Such a prediction method may be called intra subpartitions (ISP) or ISP based intra prediction.

The above-described intra prediction methods may be called an intra prediction type separately from the intra prediction mode. The intra prediction type may be called in various terms such as an intra prediction technique or an additional intra prediction mode. For example, the intra prediction type (or additional intra prediction mode) may include at least one of the above-described LIP, PDPC, MRL, and ISP. A general intra prediction method except for the specific intra prediction type such as LIP, PDPC, MRL, or ISP may be called a normal intra prediction type. The normal intra prediction type may be generally applied when the specific intra prediction type is not applied, and prediction may be performed based on the intra prediction mode described above. Meanwhile, post-filtering may be performed on the predicted sample derived as needed.

Specifically, the intra prediction procedure may include an intra prediction mode/type determination step, a neighboring reference sample derivation step, and an intra prediction mode/type based prediction sample derivation step. In addition, a post-filtering step may be performed on the predicted sample derived as needed.

When intra prediction is applied, the intra prediction mode applied to the current block may be determined using the intra prediction mode of the neighboring block. For example, the decoding apparatus may select one of most probable mode (mpm) candidates of an mpm list derived based on the intra prediction mode of the neighboring block (ex. left and/or upper neighboring blocks) of the current block based on the received mpm index and select one of the other remaining intro prediction modes not included in the mpm candidates (and planar mode) based on the remaining intra prediction mode information. The mpm list may be configured to include or not include a planar mode as a candidate. For example, if the mpm list includes the planar mode as a candidate, the mpm list may have six candidates. If the mpm list does not include the planar mode as a candidate, the mpm list may have three candidates. When the mpm list does not include the planar mode as a candidate, a not planar flag (ex. intra_luma_not_planar_flag) indicating whether an intra prediction mode of the current block is not the planar mode may be signaled. For example, the mpm flag may be signaled first, and the mpm index and not planar flag may be signaled when the value of the mpm flag is 1. In addition, the mpm index may be signaled when the value of the not planar flag is 1. Here, the mpm list is configured not to include the planar mode as a candidate does not is to signal the not planar flag first to check whether it is the planar mode first because the planar mode is always considered as mpm.

For example, whether the intra prediction mode applied to the current block is in mpm candidates (and planar mode) or in remaining mode may be indicated based on the mpm flag (ex. Intra_luma_mpm_flag). A value 1 of the mpm flag may indicate that the intra prediction mode for the current block is within mpm candidates (and planar mode), and a value 0 of the mpm flag may indicate that the intra prediction mode for the current block is not in the mpm candidates (and planar mode). The value 0 of the not planar flag (ex. Intra_luma_not_planar_flag) may indicate that the intra prediction mode for the current block is planar mode, and the value 1 of the not planar flag value may indicate that the intra prediction mode for the current block is not the planar mode. The mpm index may be signaled in the form of an mpm_idx or intra_luma_mpm_idx syntax element, and the remaining intra prediction mode information may be signaled in the form of a rem_intra_luma_pred_mode or intra_luma_mpm_remainder syntax element. For example, the remaining intra prediction mode information may index remaining intra prediction modes not included in the mpm candidates (and planar mode) among all intra prediction modes in order of prediction mode number to indicate one of them. The intra prediction mode may be an intra prediction mode for a luma component (sample). Hereinafter, intra prediction mode information may include at least one of the mpm flag (ex. Intra_luma_mpm_flag), the not planar flag (ex. Intra_luma_not_planar_flag), the mpm index (ex. mpm_idx or intra_luma_mpm_idx), and the remaining intra prediction mode information (rem_intra_luma_pred_mode or intra_luma_mpm_remainder). In the present document, the MPM list may be referred to in various terms such as MPM candidate list and candModeList. When MIP is applied to the current block, a separate mpm flag (ex. intra_mip_mpm_flag), an mpm index (ex. intra_mip_mpm_idx), and remaining intra prediction mode information (ex. intra_mip_mpm_remainder) for MIP may be signaled and the not planar flag is not signaled.

In other words, in general, when block splitting is performed on an image, a current block and a neighboring block to be coded have similar image characteristics. Therefore, the current block and the neighboring block have a high probability of having the same or similar intra prediction mode. Thus, the encoder may use the intra prediction mode of the neighboring block to encode the intra prediction mode of the current block.

For example, the encoder/decoder may configure a list of most probable modes (MPM) for the current block. The MPM list may also be referred to as an MPM candidate list. Herein, the MPM may refer to a mode used to improve coding efficiency in consideration of similarity between the current block and neighboring block in intra prediction mode coding. As described above, the MPM list may be configured to include the planar mode or may be configured to exclude the planar mode. For example, when the MPM list includes the planar mode, the number of candidates in the MPM list may be 6. And, if the MPM list does not include the planar mode, the number of candidates in the MPM list may be 5.

The encoder/decoder may configure an MPM list including 5 or 6 MPMs.

In order to configure the MPM list, three types of modes can be considered: default intra modes, neighbor intra modes, and the derived intra modes.

For the neighboring intra modes, two neighboring blocks, i.e., a left neighboring block and an upper neighboring block, may be considered.

As described above, if the MPM list is configured not to include the planar mode, the planar mode is excluded from the list, and the number of MPM list candidates may be set to 5.

In addition, the non-directional mode (or non-angular mode) among the intra prediction modes may include a DC mode based on the average of neighboring reference samples of the current block or a planar mode based on interpolation.

When inter prediction is applied, the predictor of the encoding apparatus/decoding apparatus may derive a prediction sample by performing inter prediction in units of blocks. Inter prediction may be a prediction derived in a manner that is dependent on data elements (ex. sample values or motion information) of picture(s) other than the current picture. When inter prediction is applied to the current block, a predicted block (prediction sample array) for the current block may be derived based on a reference block (reference sample array) specified by a motion vector on the reference picture indicated by the reference picture index. Here, in order to reduce the amount of motion information transmitted in the inter prediction mode, the motion information of the current block may be predicted in units of blocks, subblocks, or samples based on correlation of motion information between the neighboring block and the current block. The motion information may include a motion vector and a reference picture index. The motion information may further include inter prediction type (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, a motion information candidate list may be configured based on neighboring blocks of the current block, and flag or index information indicating which candidate is selected (used) may be signaled to derive a motion vector and/or a reference picture index of the current block. Inter prediction may be performed based on various prediction modes. For example, in the case of a skip mode and a merge mode, the motion information of the current block may be the same as motion information of the neighboring block. In the skip mode, unlike the merge mode, the residual signal may not be transmitted. In the case of the motion vector prediction (MVP) mode, the motion vector of the selected neighboring block may be used as a motion vector predictor and the motion vector of the current block may be signaled. In this case, the motion vector of the current block may be derived using the sum of the motion vector predictor and the motion vector difference.

The motion information may include L0 motion information and/or L1 motion information according to an inter prediction type (L0 prediction, L1 prediction, Bi prediction, etc.). The motion vector in the L0 direction may be referred to as an L0 motion vector or MVL0, and the motion vector in the L1 direction may be referred to as an L1 motion vector or MVL1. Prediction based on the L0 motion vector may be called L0 prediction, prediction based on the L1 motion vector may be called L1 prediction, and prediction based on both the L0 motion vector and the L1 motion vector may be called bi-prediction. Here, the L0 motion vector may indicate a motion vector associated with the reference picture list L0 (L0), and the L1 motion vector may indicate a motion vector associated with the reference picture list L1 (L1). The reference picture list L0 may include pictures that are earlier in output order than the current picture as reference pictures, and the reference picture list L1 may include pictures that are later in the output order than the current picture. The previous pictures may be called forward (reference) pictures, and the subsequent pictures may be called reverse (reference) pictures. The reference picture list L0 may further include pictures that are later in the output order than the current picture as reference pictures. In this case, the previous pictures may be indexed first in the reference picture list L0 and the subsequent pictures may be indexed later. The reference picture list L1 may further include previous pictures in the output order than the current picture as reference pictures. In this case, the subsequent pictures may be indexed first in the reference picture list 1 and the previous pictures may be indexed later. The output order may correspond to picture order count (POC) order.

Figure 4:
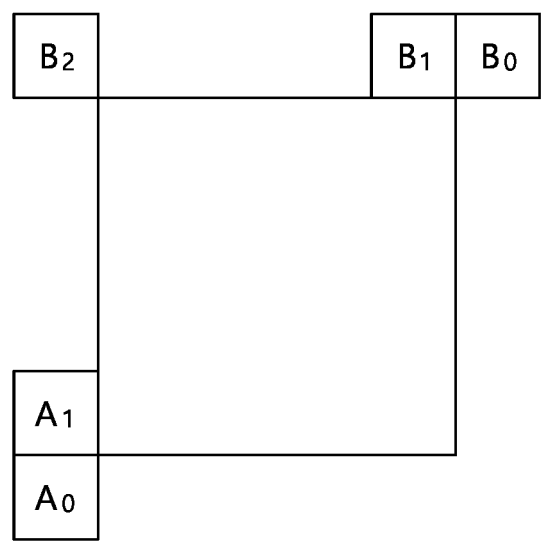
FIG. 4 is a drawing for explaining a method of deriving motion information through the inter prediction mode.

FIG. 4 is a drawing for explaining a method of deriving motion information through the inter prediction mode. Here, among the inter prediction modes, a merge mode, a motion vector prediction (MVP) mode (or advanced motion vector prediction (AMVP)), a pairwise average merge mode, and a history-based MVP (HMVP) mode are described below.

When the merge mode is applied, the motion information of the current prediction block is not directly transmitted, and the motion information of the current prediction block is derived using motion information of a neighboring prediction block. Therefore, the motion information of the current prediction block may be indicated by transmitting flag information indicating that the merge mode is used and a merge index indicating which neighboring prediction blocks are used.

The encoder must search a merge candidate block used to derive motion information of the current prediction block to perform the merge mode. For example, up to five merge candidate blocks may be used, but the present document is not limited thereto. A maximum number of the merge candidate blocks may be transmitted in a slice header, a tile group header, or a parameter set (i.e., a sequence parameter set (SPS)), and the present document is not limited thereto. After finding the merge candidate blocks, the encoder may generate a merge candidate list and select a merge candidate block having the smallest cost among them as a final merge candidate block.

The present document provides various embodiments of a merge candidate block configuring the merge candidate list.

The merge candidate list may use, for example, five merge candidate blocks. For example, four spatial merge candidates and one temporal merge candidate may be used. As a specific example, in the case of the spatial merge candidate, the blocks shown in FIG. 4 may be used as the spatial merge candidate.

The merge candidate list for the current block may be configured based on, for example, the following procedure.

The coding apparatus (encoder/decoder) inserts spatial merge candidates derived by searching for spatial neighboring blocks of the current block into the merge candidate list (S310). For example, the spatial neighboring blocks may include a bottom left corner neighboring block, a left neighboring block, a top right corner neighboring block, a top neighboring block, and a top left corner neighboring block of the current block. However, this is merely an example and, in addition to the above-described spatial neighboring blocks, additional neighboring blocks such as a right neighboring block, a bottom neighboring block, and a bottom right neighboring block may be used as the spatial neighboring blocks. The coding apparatus may search for the spatial neighboring blocks based on priority to detect available blocks and derive motion information of the detected blocks as the spatial merge candidates. For example, the encoder and decoder may search for the five blocks shown in FIG. 1.3.2-1 in order of A1, B1, B0, A0, B2 and sequentially index the available candidates to configure a merge candidate list.

The coding apparatus inserts the temporal merge candidate derived by searching the temporal neighboring block of the current block into the merge candidate list (S320). The temporal neighboring block may be located on a reference picture that is a picture different from the current picture in which the current block is located. The reference picture in which the temporal neighboring block is located may be called a collocated picture or a col picture. The temporal neighboring block may be searched in order of the bottom right corner neighboring block and the bottom right center block of the co-located block for the current block on the col picture. Meanwhile, when motion data compression is applied, specific motion information may be stored as representative motion information for each predetermined storage unit in the col picture. In this case, it is not necessary to store the motion information for all the blocks in the predetermined storage unit, thereby obtaining a motion data compression effect. In this case, the predetermined storage unit may be previously determined, for example, in 16×16 sample units, 8×8 sample units, or the like, or size information on the predetermined storage unit may be signaled from the encoder to the decoder. When the motion data compression is applied, motion information of the temporal neighboring block may be replaced with representative motion information of the predetermined storage unit in which the temporal neighboring block is located. That is, in this case, from an implementation point of view, a predetermined value is arithmetically shifted to the right based on coordinates (top left sample position) of the temporal neighboring block, and thereafter, the temporal merge candidate may be derived based on motion information of the prediction block covering an arithmetically left shifted position. For example, in the case of a sample unit having the predetermined storage unit is 2n×2n, if the coordinates of the temporal neighboring block are (xTnb, yTnb), motion information of the prediction block located at the modified position ((xTnb>>n)<<n), (yTnb>>n)<<n)). Specifically, for example, in case where the predetermined storage unit is a 16×16 sample unit, if the coordinates of the temporal neighboring block are (xTnb, yTnb), motion information of the prediction block located at modified position ((xTnb>>4)<<4), (yTnb>>4)<<4)) may be used for the temporal merge candidate. Or, for example, in case where the predetermined storage unit is an 8×8 sample unit, if the coordinates of the temporal neighboring block are (xTnb, yTnb), motion information of the prediction block located at the modified position ((xTnb>>3)<<3), (yTnb>>3)<<3)) may be used for the temporal merge candidate.

The coding apparatus may determine whether the number of current merge candidates is smaller than the maximum number of merge candidates (maximum number of candidates included in the merge candidate list) (S330). The maximum number of merge candidates may be predefined or signaled from the encoder to the decoder (i.e., through a tile group header or a SPS). For example, the encoder may generate information on the maximum number of merge candidates (maximum number of candidates included in the merge candidate list), encode the information, and transmit the encoded information to the decoder in the form of a bitstream. If the maximum number of merge candidates is filled up, a subsequent candidate addition process may not be performed.

As a result of the checking, if the number of the current merge candidates is smaller than the maximum number of merge candidates, the coding apparatus inserts the additional merge candidate into the merge candidate list (S340). The additional merge candidate may include, for example, an ATMVP, and a combined bi-predictive merge candidate (when the slice/tile type of the current slice/tile group is B) and/or a zero vector merge candidate.

As a result of the checking, if the number of the current merge candidates is not smaller than the number of the maximum merge candidates, the coding apparatus may terminate the construction of the merge candidate list. In this case, the encoder may select an optimal merge candidate among merge candidates configuring the merge candidate list based on a rate-distortion (RD) cost, and signal selection information (ex. merge index) indicating the selected merge candidate to the decoder. The decoder may select the optimal merge candidate based on the merge candidate list and the selection information.

As described above, the motion information of the selected merge candidate may be used as the motion information of the current block, and the prediction samples of the current block may be derived based on the motion information of the current block. An encoder may derive residual samples of the current block based on the prediction samples, and may signal residual information on the residual samples to a decoder. The decoder may generate reconstructed samples based on the residual samples and the predicted samples derived based on the residual information, and generate a reconstructed picture based thereon as described above.

When the skip mode is applied, the motion information of the current block may be derived in the same manner as that of the case where the merge mode is applied. However, when the skip mode is applied, the residual signal for the corresponding block is omitted, and thus prediction samples may be used as reconstructed samples.

When a motion vector prediction (MVP) mode is applied, a motion vector predictor (mvp) candidate list may be generated using a motion vector of a reconstructed spatial neighboring block (which may be the neighboring block of FIG. 4) and/or a motion vector of a temporal neighboring block (or Col block). That is, the motion vector corresponding to the reconstructed spatial neighboring block and/or the motion vector corresponding to the temporal neighboring block may be used as a motion vector predictor candidate. When bi-prediction is applied, an mvp candidate list for deriving L0 motion information and an mvp candidate list for deriving L1 motion information may be generated and used separately. The above-described prediction information (or information on the prediction) may include selection information (ex. MVP flag or MVP index) indicating an optimal motion vector predictor candidate selected from the motion vector predictor candidates included in the list. In this case, the predictor may select a motion vector predictor of the current block from among the motion vector predictor candidates included in the motion vector candidate list using the selection information. The predictor of the encoding apparatus may obtain a motion vector difference (MVD) between the motion vector of the current block and the motion vector predictor, encode the same, and output it in a bitstream form. That is, the MVD may be obtained as a value obtained by subtracting the motion vector predictor from the motion vector of the current block. In this case, the predictor of the decoding apparatus may obtain a motion vector difference included in the information on the prediction and derive the motion vector of the current block by adding the motion vector difference and the motion vector predictor. The predictor of the decoding apparatus may obtain or derive a reference picture index indicating the reference picture from the information on the prediction.

The history-based MVP (HMVP) merge candidates can be added to merge list after the spatial MVP and TMVP. In this method, the motion information of a previously coded block is stored in a table and used as MVP for the current CU. The table with multiple HMVP candidates is maintained during the encoding/decoding process. The table is reset (emptied) when a new CTU row is encountered. Whenever there is a non-subblock inter-coded CU, the associated motion information is added to the last entry of the table as a new HMVP candidate.

The HMVP table size S is set to be 6, which indicates up to 6 History-based MVP (HMVP) candidates may be added to the table. When inserting a new motion candidate to the table, a constrained first-in-first-out (FIFO) rule is utilized wherein redundancy check is firstly applied to find whether there is an identical HMVP in the table. If found, the identical HMVP is removed from the table and all the HMVP candidates afterwards are moved forward, HMVP candidates could be used in the merge candidate list construction process. The latest several HMVP candidates in the table are checked in order and inserted to the candidate list after the TMVP candidate. Redundancy check is applied on the HMVP candidates to the spatial or temporal merge candidate.

To reduce the number of redundancy check operations, the following simplifications are introduced:

1) Number of HMPV candidates is used for merge list generation is set as (N<=4)? M: (8−N), wherein N indicates number of existing candidates in the merge list and M indicates number of available HMVP candidates in the table.

2) Once the total number of available merge candidates reaches the maximally allowed merge candidates minus 1, the merge candidate list construction process from HMVP is terminated.

Pairwise average candidates are generated by averaging predefined pairs of candidates in the existing merge candidate list, and the predefined pairs are defined as {(0, 1), (0, 2), (1, 2), (0, 3), (1, 3), (2, 3)}, where the numbers denote the merge indices to the merge candidate list. The averaged motion vectors are calculated separately for each reference list. If both motion vectors are available in one list, these two motion vectors are averaged even when they point to different reference pictures; if only one motion vector is available, use the one directly; if no motion vector is available, keep this list invalid.

When the merge list is not full after pair-wise average merge candidates are added, the zero MVPs are inserted in the list until the maximum merge candidate number is encountered.

Hereinafter, the detailed description of IBC, which may be performed by the predictor of the apparatus of FIG. 2 or FIG. 3, will be described. The IBC may be used for content image/video coding of a game or the like, for example, screen content coding (SCC). The IBC basically performs prediction in the current picture but may be performed similarly to inter prediction in that a reference block is derived in the current picture. That is, IBC may use at least one of the inter prediction techniques described in the present document. For example, the IBC may use at least one of the above-described methods for deriving motion information (motion vector). The IBC may refer to the current picture, and thus may be referred to as a current picture referencing (CPR). When the above-described prediction methods are applied in the IBC, a motion vector (motion information) may be generally referred to (replaced or mixed) as a block vector (block information).

For the IBC, the encoding apparatus may perform block matching (BM) to derive an optimal block vector (or motion vector) for the current block (ex. CU). The derived block vector (or motion vector) may be signaled to the decoding apparatus through a bitstream using a method similar to the block information (motion vector) signaling in inter prediction described above. The decoding apparatus may derive a reference block for the current block in the current picture through the signaled block vector (motion vector), thereby driving a prediction signal (predicted block or predicted samples) for the current block. Here, the block vector (or motion vector) may represent a displacement from the current block to the reference block located in an area already reconstructed in the current picture. Thus, the block vector (or motion vector) may be called a displacement vector. Hereinafter, in the IBC, the motion vector may correspond to the block vector or the displacement vector. The motion vector of the current block may include a motion vector for a luma component (luma motion vector) or a motion vector for a chroma component (chroma motion vector). For example, the luma motion vector for an IBC coded CU may be an integer sample unit (i.e., integer precision). Chroma motion vectors may also be clipped in integer sample units. As mentioned above, the IBC may use at least one of the inter prediction techniques, for example, 1-pel and 4-pel motion vector precision may be switched when the IBC is applied like AMVR.

To reduce memory consumption and decoder complexity, only the reconstructed portion of the predefined area including current CTU may be used. This restriction allows the IBC mode to be implemented using local on-chip memory for hardware implementations.

At the encoder side, hash-based motion estimation is performed for IBC. The encoder performs RD check for blocks with either width or height no larger than 16 luma samples. For non-merge mode, the block vector search is performed using hash-based search first. If hash search does not return valid candidate, block matching based local search will be performed.

In the hash-based search, hash key matching (32-bit CRC) between the current block and a reference block is extended to all allowed block sizes. The hash key calculation for every position in the current picture is based on 4×4 sub-blocks. For the current block of a larger size, a hash key is determined to match that of the reference block when all the hash keys of all 4×4 sub-blocks match the hash keys in the corresponding reference locations. If hash keys of multiple reference blocks are found to match that of the current block, the block vector costs of each matched reference are calculated and the one with the minimum cost is selected.

In block matching search, the search range is set to be N samples to the left and on top of the current block within the current CTU. At the beginning of a CTU, the value of N is initialized to 128 if there is no temporal reference picture, and initialized to 64 if there is at least one temporal reference picture. A hash hit ratio is defined as the percentage of samples in the CTU that found a match using hash-based search. While encoding the current CTU, if the hash hit ratio is below 5%, N is reduced by half.

At CU level, the IBC mode is signaled with a flag information (i.e., flag information specifying whether the IBC is applied, pred_mode_ibc_flag), and it can be signaled as an IBC AMVP mode or an IBC skip/merge mode as follows.

IBC skip/merge mode: a merge candidate index is used to indicate which of the block vectors in the list from neighboring candidate IBC coded blocks is used to predict the current block. The merge list consists of spatial, HMVP, and pairwise candidates.

IBC AMVP mode: block vector difference is coded in the same way as the motion vector difference. The block vector prediction method uses two candidates as predictors, one from left neighbor and one from above neighbor (if IBC coded). When either neighbor is not available, a default block vector will be used as a predictor. A flag is signaled to indicate the block vector predictor index.

Figure 5:
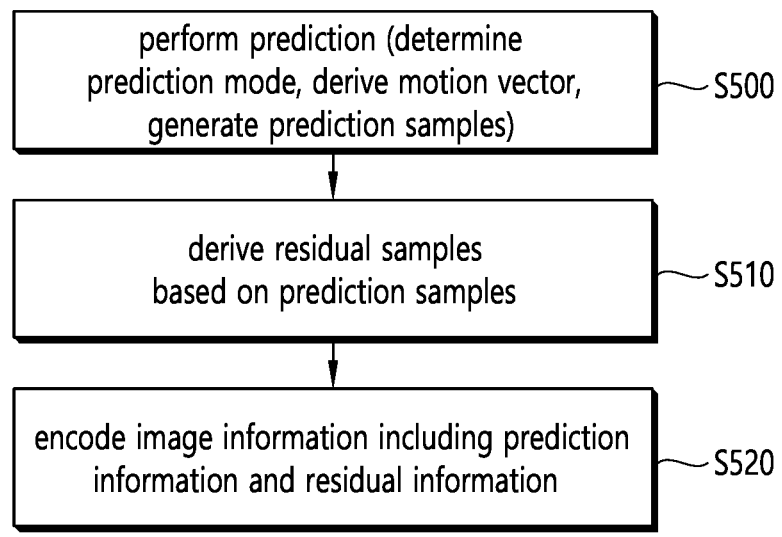
FIG. 5 and FIG. 6 illustrate an image encoding method based on the IBC prediction mode and a predictor of an encoding apparatus performing the image encoding method.
Figure 6:
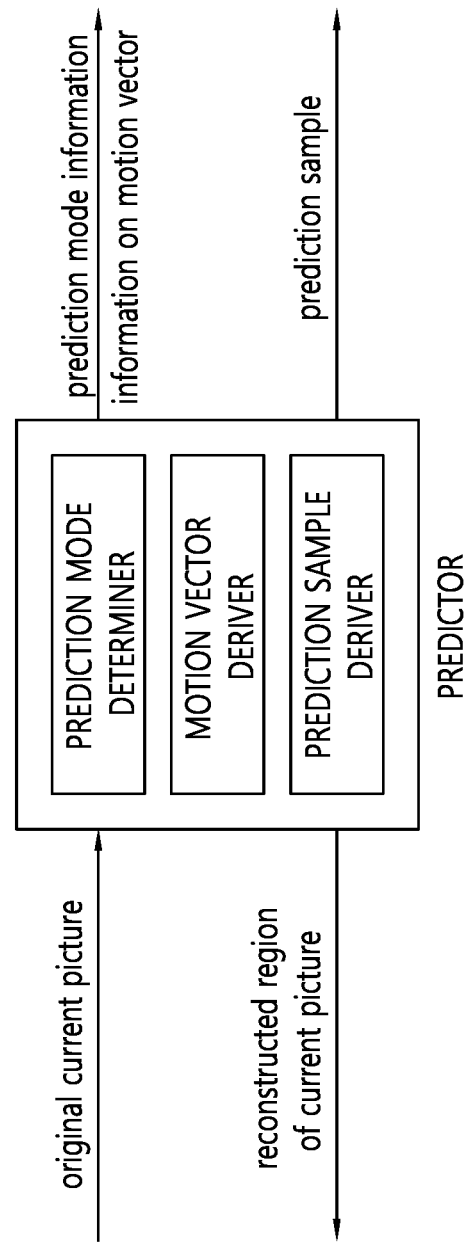

FIG. 5 and FIG. 6 illustrate an image encoding method based on the IBC prediction mode and a predictor of an encoding apparatus performing the image encoding method.

The encoding apparatus may derive prediction mode and a motion vector of the current block, and generate prediction samples of the current block (S500). The prediction mode may include at lesat one of the inter prediction modes described above. Here, the prediction mode determination, the motion vector derivation, and the prediction samples generation procedure may be performed simultaneously, or one procedure may be performed before the other. For example, the predictor of the encoding apparatus may include a prediction mode determiner, a motion vector deriver, and a prediction sample deriver. The prediction mode determiner may determine a prediction mode for the current block, the motion vector deriver may derive motion vector of the current block, and prediction sample deriver 183 may derive prediction samples of the current block. As described above, the motion vector may be called a block vector. For example, the predictor of the encoding apparatus may search for a block similar to the current block in a reconstructed region (or a predetermined region (search region)) through block matching (BM) and derive a reference block whose difference to the current block is a minimum or a predetermined reference or less. The predictor may derive a motion vector based on a displacement difference between the reference block and the current block. The encoding apparatus may determine a mode applied to the current block among various prediction modes. The encoding apparatus may compare RD costs based on the various prediction modes and determine an optimal prediction mode for the current block.

For example, when a skip mode or a merge mode is applied to the current block, the encoding apparatus may configure a merge candidate list described above and derive a reference block having a difference from the current block equal to or less than a minimum or a predetermined criterion. In this case, a merge candidate associated with the derived reference block may be selected, and merge index information indicating the selected merge candidate may be generated and signaled to the decoding apparatus. The motion vector of the current block may be derived using the motion vector of the selected merge candidate.

As another example, when the (A)MVP mode is applied to the current block, the encoding apparatus may configure a (A)MVP candidate list described above and use a motion vector of an mvp candidate selected from among the mvp (motion vector predictor) candidates included in the (A)MVP candidate list, as mvp of the current block. In this case, for example, a motion vector indicating the reference block derived by the above-described motion estimation may be used as the motion vector of the current block, and an mvp candidate having a motion vector whose difference to the motion vector of the current block, among the mvp candidates, is smallest may be the selected mvp candidate. A motion vector difference (MVP) which is a difference from which the mvp was subtracted may be derived from the motion vector of the current block. In this case, the information on the MVD may be signaled to the decoding apparatus.

The encoding apparatus may derive residual samples based on the prediction samples (S510). The encoding apparatus may derive the residual samples by comparing the original samples of the current block with the prediction samples.

The encoding apparatus encodes image information including prediction information and residual information (S520). The encoding apparatus may output the encoded image information in the form of a bitstream. The prediction information may include prediction mode vector (i.e., skip flag, merge flag or mode index) and information on motion vector as information related to the prediction procedure. The information on the motion vector may include candidate selection information (ex. merge index, mvp flag or mvp index) that is information for deriving a motion vector. In addition, the information on the motion vector may include the information on the MVD described above. The information on the motion vector may include information indicating whether L0 prediction, L1 prediction, or bi prediction is applied. The residual information is information on the residual samples. The residual information may include information on quantized transform coefficients for the residual samples.

The output bitstream may be stored in a (digital) storage medium and delivered to the decoding apparatus, or may be delivered to the decoding apparatus via a network.

Meanwhile, as described above, the encoding apparatus may generate a reconstructed picture (including the reconstructed samples and the reconstructed block) based on the reference samples and the residual samples. This is because the encoding apparatus is to derive the same prediction result as that performed in the decoding apparatus, and thus the coding efficiency may be increased. Therefore, the encoding apparatus may store the reconstructed picture (or reconstructed samples, a reconstructed block) in a memory and use it as a reference picture for inter prediction.

Figure 7:
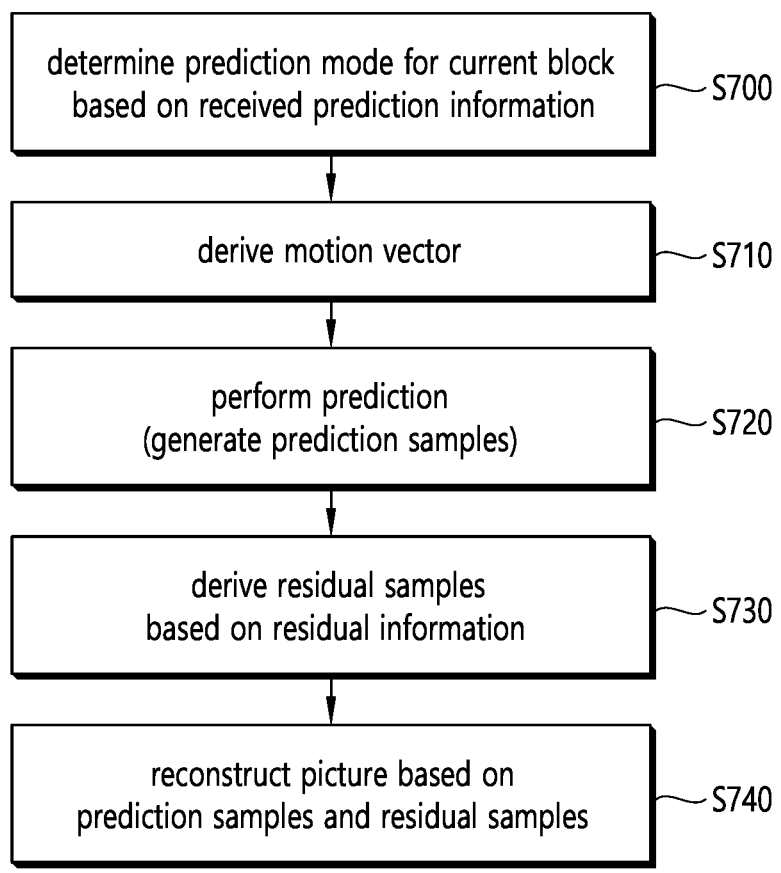
FIG. 7 and FIG. 8 illustrate an image decoding method based on the IBC prediction mode and a predictor of a decoding apparatus performing the image decoding method.
Figure 8:
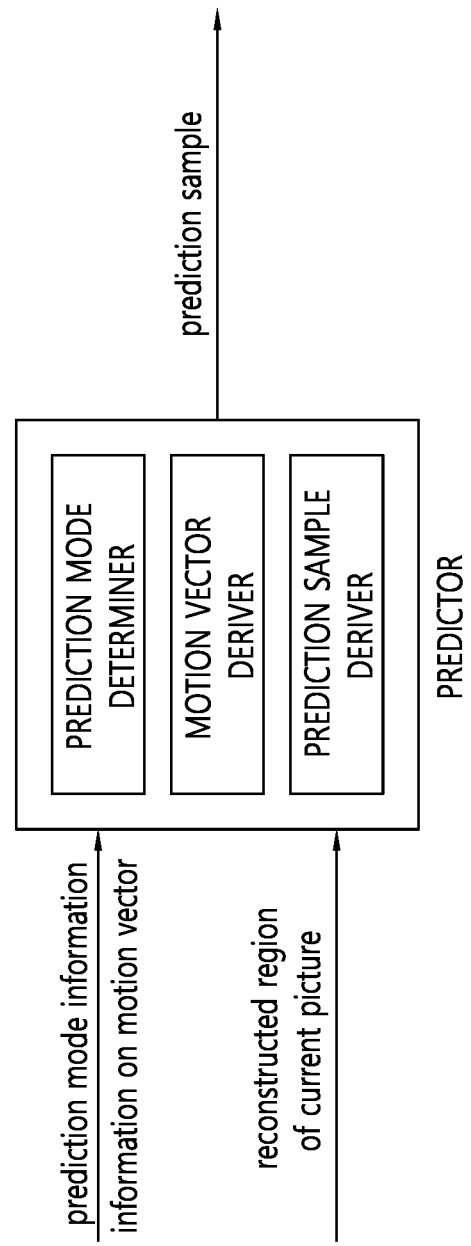

FIG. 7 and FIG. 8 illustrate an image decoding method based on the IBC prediction mode and a predictor of a decoding apparatus performing the image decoding method.

The decoding apparatus may perform an operation corresponding to the operation performed in the encoding apparatus. The decoding apparatus may perform IBC prediction on the current block based on the received prediction information and derive prediction samples.

Specifically, the decoding apparatus may determine a prediction mode for the current block based on the received prediction information (S700). The decoding apparatus may determine which inter prediction mode is applied to the current block based on the prediction mode information in the prediction information.

For example, the decoding apparatus may determine whether the merge mode is applied to the current block or whether (A)MVP mode is determined based on the merge flag. Alternatively, one of various inter prediction mode candidates may be selected based on the mode index. The inter prediction mode candidates may include a skip mode, a merge mode, and/or (A)MVP mode, or may include various inter prediction modes described with FIG. 4.

The decoding apparatus derives motion vector of the current block based on the determined prediction mode (S710). As described above, the motion vector may be called a block vector. For example, when a skip mode or a merge mode is applied to the current block, the decoding apparatus may configure a merge candidate list as described above, and select one of the merge candidates included in the merge candidate list. The selection may be performed based on the above selection information (merge index). The motion vector of the current block may be derived using the motion vector of the selected merge candidate. The motion vector of the selected merge candidate may be used as motion vector of the current block.

As another example, when the (A)MVP mode is applied to the current block, the decoding apparatus may configure an (A)MVP candidate list as described above and use a motion vector of an mvp candidate selected from the mvp candidates included in the (A)MVP candidate list as mvp of the current block. The selection may be performed based on the above-described selection information (mvp flag or mvp index). In this case, the MVD of the current block may be derived based on the information on the MVD, and the motion vector of the current block may be derived based on mvp and the MVD of the current block. In addition, a reference picture index of the current block may be derived based on the reference picture index information. A picture indicated by the reference picture index in the reference picture list for the current block may be derived as a reference picture referred for inter prediction of the current block.

Meanwhile, as described above, motion vector of the current block may be derived without configuring a candidate list, and in this case, motion vector of the current block may be derived according to a procedure disclosed in the corresponding prediction mode. In this case, the configuration of the candidate list as described above may be omitted.

The decoding apparatus may generate prediction samples for the current block based on the motion vector of the current block (S720). The decoding apparatus may derive the prediction samples of the current block using the samples of the reference block indicated by the motion vector of the current block on the current picture. In this case, a prediction sample filtering procedure may be further performed on all or some of the prediction samples of the current block.

For example, the predictor of the decoding apparatus may include a prediction mode determiner, a motion vector deriver, and a prediction sample deriver. The prediction mode for the current block may be determined based on the prediction mode vector received from the prediction mode determiner, motion vector of the current block may be derived based on the information on the motion vector received from the motion vector deriver 262, and the prediction sample deriver may derive the prediction samples of the current block.

The decoding apparatus generates residual samples for the current block based on the received residual information (S730). The decoding apparatus may generate reconstructed samples for the current block based on the prediction samples and the residual samples and generate a reconstructed picture based thereon (S740). Thereafter, an in-loop filtering procedure or the like may be further applied to the reconstructed picture as described above.

Embodiments related to merge mode and skip mode among IBC prediction modes will be described together with the following tables. Specifically, a method, for determining the maximum number of merge mode candidates derived to find a motion vector of a current block when IBC is used, is shown.

The following table is an exemplary syntax of the tile group header.

TABLE 1

| tile_group_header( ) { | Descriptor |
|---|---|
| ... | |
| if ( tile_group_type != I ) { | |
|   if( sps_temporal_mvp_enabled_flag ) | |
|     tile_group_temporal_mvp_enabled_flag | u(1) |
|   if( tile_group_type = = B ) | |
|     mvd_l1_zero_flag | u(1) |
|   if( tile_group_temporal_mvp_enabled_flag ) { | |
|     if( tile_group_type = = B ) | |
|       collocated_from_l0_flag | u(1) |
|   } | |
|   if( ( weighted_pred_flag && tile_group_type = = P ) | | ( weighted_bipred_flag && tile_group_type = = B ) ) | |
|     pred_weight_table( ) | |
|   six_minus_max_num_merge_cand | ue(v) |
|   if( sps_affine_enabled_flag ) | |
|     five_minus_max_num_subblock_merge_cand | ue(v) |
|   if( sps_fpel_mmvd_enabled_flag ) | |
|     tile_group_fpel_mmvd_enabled_flag | u(1) |
| } else if ( sps_ibc_enabled_flag ) | |
|   six_minus_max_num_merge_cand | ue(v) |
| ... | |

In the next generation video codec technology, when the tile group type (tile_group_type) is P (uni-directional prediction) or B (bi-directional prediction), the maximum number of general merge mode candidates is determined by the syntax element six_minus_max_num_merge_cand, and the maximum number of merge mode candidates for IBC may be determined with the same.

When the tile group type (tile_group_type) is I (intra prediction), a general merge mode is not present, thus the same syntax, six_minus_max_num_merge_cand, is transmitted to determine the maximum number of merge mode candidates for IBC.

The IBC technology is a technology for performing motion compensation within a picture, and may have different characteristics from the merge mode of the existing inter prediction, and a method for constructing merge mode candidates may be different. Therefore, using the same number of merge candidates may not be efficient in terms of compression performance.

In one example, the syntax of the tile group header may be as shown in the following table.

TABLE 2

| tile_group_header( ) { | Descriptor |
|---|---|
| ... | |
| if ( tile_group_type != I ) { | |
|   if( sps_temporal_mvp_enabled_flag ) | |
|     tile_group_temporal_mvp_enabled_flag | u(1) |
|   if( tile_group_type = = B ) | |
|     mvd_l1_zero_flag | u(1) |
|   if( tile_group_temporal_mvp_enabled_flag ) { | |
|     if( tile_group_type = = B ) | |
|       collocated_from_l0_flag | u(1) |
|   } | |
|   if( ( weighted_pred_flag && tile_group_type = = P ) \|\| ( weighted_bipred_flag && tile_group_type = = B ) ) | |
|     pred_weight_table( ) | |
|   six_minus_max_num_merge_cand | ue(v) |
|   if( sps_affine_enabled_flag ) | |
|     five_minus_max_num_subblock_merge_cand | ue(v) |
|   if( sps_fpel_mmvd_enabled_flag ) | |
|     tile_group_fpel_mmvd_enabled_flag | u(1) |
| } | |
| if ( sps_ibc_enabled_flag ) | |
|   six_minus_max_num_ibc_merge_cand | ue(v) |
| ... | |

The semantics of syntax elements included in the syntax of Table 2 may be expressed, for example, as shown in the following table.

TABLE 3 six_minus_max_num_ibc_merge_cand specifies the maximum number of merging motion vector prediction (MVP) candidates supported in the tile group subtracted from 6. The maximum number of merging MVP candidates, MaxNumibcMergeCand is derived as follows:
  MaxNumibcMergeCand = 6 - six_minus_max_num_ibc_merge_cand
The value of MaxNumibcMergeCand shall be in the range of 1 to 6, inclusive.

In the other example, the syntax of the tile group header may be as shown in the following table.

TABLE 4

| tile_group_header( ) { | Descriptor |
|---|---|
| ... | |
| if ( tile_group_type != I ) { | |
|   if( sps_temporal_mvp_enabled_flag ) | |
|     tile_group_temporal_mvp_enabled_flag | u(1) |
|   if( tile_group_type = = B ) | |
|     mvd_l1_zero_flag | u(1) |
|   if( tile_group_temporal_mvp_enabled_flag ) { | |
|     if( tile_group_type = = B ) | |
|       collocated_from_l0_flag | u(1) |
|   } | |
|   if( ( weighted_pred_flag && tile_group_type = = P ) \|\| ( weighted_bipred_flag && tile_group_type = = B ) ) | |
|     pred_weight_table( ) | |
|   six_minus_max_num_merge_cand | ue(v) |
|   if( sps_affine_enabled_flag ) | |
|     five_minus_max_num_subblock_merge_cand | ue(v) |
|   if( sps_fpel_mmvd_enabled_flag ) | |
|     tile_group_fpel_mmvd_enabled_flag | u(1) |
| } | |
| if ( sps_ibc_enabled_flag ) | |
|   five_minus_max_num_ibc_merge_cand | ue(v) |
| ... | |

The semantics of syntax elements included in the syntax of Table 4 may be expressed, for example, as shown in the following table.

TABLE 5 five_minus_max_num_ibc_merge_cand specifies the maximum number of merging motion vector prediction (MVP) candidates supported in the tile group subtracted from 5. The maximum number of merging MVP candidates, MaxNumibcMergeCand is derived as follows:
  MaxNumibcMergeCand = 5 - five_minus_max_num_ibc_merge_cand
The value of MaxNumibcMergeCand shall be in the range of 1 to 5, inclusive.

In the other example, the syntax of the tile group header may be as shown in the following table.

TABLE 6

| tile_group_header( ) { | Descriptor |
|---|---|
| ... | |
| if ( tile_group_type != I ) { | |
|   if( sps_temporal_mvp_enabled_flag ) | |
|     tile_group_temporal_mvp_enabled_flag | u(1) |
|   if( tile_group_type = = B ) | |
|     mvd_l1_zero_flag | u(1) |
|   if( tile_group_temporal_mvp_enabled_flag ) { | |
|     if( tile_group_type = = B ) | |
|       collocated_from_l0_flag | u(1) |
|   } | |
|   if( ( weighted_pred_flag && tile_group_type = = P ) \|\| ( weighted_bipred_flag && tile_group_type = = B ) ) | |
|     pred_weight_table( ) | |
|   six_minus_max_num_merge_cand | ue(v) |
|   if( sps_affine_enabled_flag ) | |
|     five_minus_max_num_subblock_merge_cand | ue(v) |
|   if( sps_fpel_mmvd_enabled_flag ) | |
|     tile_group_fpel_mmvd_enabled_flag | u(1) |
| } | |
| if ( sps_ibc_enabled_flag ) | |
|   four_minus_max_num_ibc_merge_cand | ue(v) |
| ... | |

The semantics of syntax elements included in the syntax of Table 6 may be expressed, for example, as shown in the following table.

TABLE 7 four_minus_max_num_ibc_merge_cand specifies the maximum number of merging motion vector prediction (MVP) candidates supported in the tile group subtracted from 4. The maximum number of merging MVP candidates, MaxNumibcMergeCand is derived as follows:
  MaxNumibcMergeCand = 4 - four_minus_max_num_ibc_merge_cand
The value of MaxNumibcMergeCand shall be in the range of 1 to 4, inclusive.

In the other example, the syntax of the tile group header may be as shown in the following table.

TABLE 8

| | Descriptor |
|---|---|
| tile_group_header( ) { | |
| ... | |
|   if (tile_group_type ! = I ) { | |
|     if( sps_temporal_mvp_enabled_flag ) | |
|       tile_group_temporal_mvp_enabled_flag | u(1) |
|     if( tile_group_type == B ) | |
|       mvd_l1_zero_flag | u(1) |
|     if( tile_group_temporal_mvp_enabled_flag ) { | |
|       if( tile_group_type == B ) | |
|         collocated_from_l0_flag | u(1) |
|     } | |
|     if( ( weighted_pred_flag && tile_group_type == P ) \|\| | |
|       ( weighted_bipred_flag && tile_group_type == B ) ) | |
|       pred_weight_table( ) | |
|     six_minus_max_num_merge_cand | ue(v) |
|     if( sps_affine_enabled_flag ) | |
|       five_minus_max_num_subblock_merge_cand | ue(v) |
|     if( sps_fpel_mmvd_enabled_flag ) | |
|       tile_group_fpel_mmvd_enabled_flag | u(1) |
|   } | |
|   if ( sps_ibc_enabled_flag ) | |
|     three_minus_max_num_ibc_merge_cand | ue(v) |
| ... | |

The semantics of syntax elements included in the syntax of Table 8 may be expressed, for example, as shown in the following table.

TABLE 9 three_minus_max_num_ibc_merge_cand specifies the maximum number of merging motion vector prediction (MVP) candidates supported in the tile group subtracted from 3. The maximum number of merging MVP candidates, MaxNumibcMergeCand is derived as follows:
MaxNumibcMergeCand = 3 − three_minus_max_num_ibc_merge_cand
The value of MaxNumibcMergeCand shall be in the range of 1 to 3, inclusive.

In another example, the syntax of the tile group header may be as shown in the following table.

TABLE 10

| tile_group_header( ) { | Descriptor |
|---|---|
| ... | |
| if ( tile_group_type != I ) { | |
|   if( sps_temporal_mvp_enabled_flag ) | |
|     tile_group_temporal_mvp_enabled_flag | u(1) |
|   if( tile_group_type == B ) | |
|     mvd_l1_zero_flag | u(1) |
|   if( tile_group_temporal_mvp_enabled_flag ) { | |
|     if( tile_group_type == B ) | |
|       collocated_from_l0_flag | u(1) |
|   } | |
|   if( ( weighted_pred_flag && tile_group_type == P ) \|\| ( weighted_bipred_flag && tile_group_type == B ) ) | |
|     pred_weight_table( ) | |
|   six_minus_max_num_merge_cand | ue(v) |
|   if( sps_affine_enabled_flag ) | |
|     five_minus_max_num_subblock_merge_cand | ue(v) |
|   if( sps_fpel_mmvd_enabled_flag ) | |
|     tile_group_fpel_mmvd_enabled_flag | u(1) |
| } | |
| if ( sps_ibc_enabled_flag ) | |
|   two_minus_max_num_ibc_merge_cand | ue(v) |
| ... | |

The semantics of syntax elements included in the syntax of Table 10 may be expressed, for example, as shown in the following table.

TABLE 11 two_minus_max_num_ibc_merge_cand specifies the maximum number of merging motion vector prediction (MVP) candidates supported in the tile group subtracted from 2. The maximum number of merging MVP candidates, MaxNumibcMergeCand is derived as follows:
  MaxNumibcMergeCand = 2 − two_minus_max_num_ibc_merge_cand
The value of MaxNumibcMergeCand shall be in the range of 1 to 2, inclusive.

When the above-mentioned examples are described in the standard document format, it can be expressed as follows, and the details are apparent to those skilled in the art.

TABLE 12

8.6.2 Derivation process for motion vector components for IBC blocks
8.6.2.1 General
Inputs to this process are:
- a luma location ( xCb, yCb ) of the top-left sample of the current luma coding block relative to the top-left luma sample of the current picture,
- a variable cbWidth specifying the width of the current coding block in luma samples,
- a variable cbHeight specifying the height of the current coding block in luma samples.
Outputs of this process are:
- the luma motion vector in 1/16 fractional-sample accuracy mvL.
The luma motion vector mvL is derived as follows:
- If merge_flag[ xCb ][ yCb ] is equal to 1, the derivation process for luma motion vectors for merge mode as specified in clause 8.6.2.2 is invoked with the luma location ( xCb, yCb ), the variables cbWidth and cbHeight inputs, and the output being the luma motion vector mvL.
- Otherwise, the following applies:
  1. The variable mvd is derived as follows:
     mvd[ 0 ] = MvdL0[ xCb ][ yCb ][ 0 ]     (8-967)
     mvd[ 1 ] = MvdL0[ xCb ][ yCb ][ 1 ]     (8-210)
  2. The derivation process for luma motion vector prediction in clause 8.6.2.6 is invoked with the luma coding block location ( xCb, yCb ), the coding block width cbWidth and the coding block height cbHeight as inputs, and the output being mvp.
  3. The luma motion vector mvL is derived as follows:
     $u[ 0 ] = ( mvp[ 0 ] + mvd[ 0 ] + 2^{18} ) \% 2^{18}$     (8-968)
     $mvL[ 0 ] = ( u[ 0 ] >= 2^{17} ) ? ( u[ 0 ] - 2^{18} ) : u[ 0 ]$     (8-969)
     $u[ 1 ] = ( mvp[ 1 ] + mvd[ 1 ] + 2^{18} ) \% 2^{18}$     (8-970)
     $mvL[ 1 ] = ( u[ 1 ] >= 2^{17} ) ? ( u[ 1 ] - 2^{18} ) : u[ 1 ]$     (8-971)
     NOTE 1-The resulting values of mvL[ 0 ] and mvL[ 1 ] as specified above will always be in the range of $-2^{17}$ to $2^{17} - 1$, inclusive.
The updating process for the history-based motion vector predictor list as specified in clause 8.6.2.10 is invoked with luma motion vector mvL.
It is a requirement of bitstream conformance that the luma motion vector mvL shall obey the following constraints:
- When the derivation process for block availability as specified in clause 6.4.X [Ed. (BB): Neighbouring blocks availability checking process tbd] is invoked with the current luma location ( xCurr, yCurr ) set equal to ( xCb, yCb ) and the neighbouring luma location ( xCb + (mvL[ 0 ] >> 4 ), yCb + ( mvL[ 1 ] >> 4 ) ) as inputs, and the output shall be equal to TRUE.
- When the derivation process for block availability as specified in clause 6.4.X [Ed. (BB): Neighbouring blocks availability checking process tbd] is invoked with the current luma location ( xCurr, yCurr ) set equal to ( xCb, yCb ) and the neighbouring luma location ( xCb + ( mvL[ 0 ] >> 4 ) + cbWidth − 1, yCb + ( mvL[ 1 ] >> 4 ) + cbHeight − 1) as inputs, and the output shall be equal to TRUE.
- One or both the following conditions shall be true:
  - The value of ( mvL[ 0 ] >> 4 ) + cbWidth is less than or equal to 0.
  - The value of ( mvL[ 1 ] >> 4 ) + cbHeight is less than or equal to 0.
- The following conditions shall be true:
  ( yCb + ( mvL[ 1 ] >> 4 ) ) >> CtbLog2SizeY = yCb >> CtbLog2SizeY     (8-972)
  ( yCb + ( mvL[ 1 ] >> 4 ) + cbHeight − 1) >> CtbLog2SizeY = yCb >> CtbLog2SizeY     (8-973)
  ( xCb + ( mvL[ 0 ] >> 4 ) ) >> CtbLog2SizeY >= ( xCb >> CtbLog2SizeY) − 1     (8-974)
  ( xCb + ( mvL[ 0 ] >> 4 ) + cbWidth − 1) >> CtbLog2SizeY <= ( xCb >> CtbLog2SizeY )     (8-975)
  [Ed. (SL): conditions (8-218) and (8-216) might have been checked by 6.4.X.]
- When ( xCb + ( mvL[ 0 ] >> 4 ) ) >> CtbLog2SizeY is equal to ( xCb >> CtbLog2SizeY) − 1, the derivation process for block availability as specified in clause 6.4.X [Ed. (BB): Neighbouring blocks availability checking process tbd] is invoked with the current luma location( xCurr, yCurr ) set equal to ( xCb, yCb ) and the neighbouring luma location ( ( ( xCb + (mvL[ 0 ] >> 4 ) + CtbSizeY ) >> ( CtbLog2SizeY − 1 ) ) << ( CtbLog2SizeY − 1), ( ( yCb + ( mvL[ 1 ] >> 4 ) ) >> ( CtbLog2SizeY − 1 ) ) << ( CtbLog2SizeY − 1 ) ) as inputs, and the output shall be equal to FALSE.
8.6.2.2 Derivation process for luma motion vector for merge mode
This process is only invoked when merge_flag[ xCb ][ yPb ] is equal to 1 and CuPredMode[ xCb ][ yPb ] is equal to MODE_IBC, where ( xCb, yCb ) specify the top-left sample of the current luma coding block relative to the top-left luma sample of the current picture.
Inputs to this process are:
- a luma location ( xCb, yCb ) of the top-left sample of the current luma coding block relative to the top-left luma sample of the current picture,
- a variable cbWidth specifying the width of the current coding block in luma samples,
- a variable cbHeight specifying the height of the current coding block in luma samples.
Outputs of this process are:
- the luma motion vectors in 1/16 fractional-sample accuracy mvL.
The luma motion vector mvL is derived by the following ordered steps:
  1. The derivation process for merging candidates from neighbouring coding units as specified in clause 8.6.2.3 is invoked with the luma coding block location ( xCb, yCb ), the luma coding block width cbWidth, and the luma coding block height cbHeight as inputs, and the outputs being the availability flags availableFlag$_{A_0}$, availableFlag$_{A_1}$, availableFlag$_{B_0}$, availableFlag$_{B_1}$ and availableFlag$_{B_2}$ and the motion vectors mvA$_0$, mvA$_1$, mvB$_0$, mvB$_1$ and mvB$_2$.
  2. The merging motion vector candidate list, mergeMvCandList, is constructed as follows:
     i = 0
     if( availableFlag$_{A_1}$ )
       mergeMvCandList [ i++ ] = mvA$_1$
     if( availableFlag$_{B_1}$ )
       mergeMvCandList [ i++ ] = mvB$_1$ TABLE 12-continued

```
        if( availableFlagB_0 )                                              (8-976)
            mergeMvCandList [ i++ ] = mvB_0
        if( availableFlagA_0 )
            mergeMvCandList [ i++ ] = mvA_0
        if( availableFlagB_2 )
            mergeMvCandList [ i++ ] = mvB_2
 3. The variable numCurrMergeCand is set equal to the number of merging candidates in the
    mergeMvCandList.
 4. When numCurrMergeCand is less than (MaxNumibcMergeCand − 1) and NumHmvpIbcCand is
    greater than 0, the derivation process of history-based merging candidates as specified in 8.6.2.5 is
    invoked with mergeMvCandList, and numCurrMergeCand as inputs, and modified mergeMvCandList
    and numCurrMergeCand as outputs.
 5. When numCurrMergeCand is less than MaxNumibcMergeCand and greater than 1, the derivation
    process for pairwise average merging candidate specified in clause 8.6.2.4 is invoked with
    mergeMvCandList and numCurrMergeCand as inputs, and the outputs are assigned to
    mergeMvCandList and numCurrMergeCand.
 6. The following assignments are made:
        mvL[ 0 ] = mergeMvCandList[ merge_idx[ xCb ][ yCb ] ][ 0 ]          (8-977)
        mvL[ 1 ] = mergeMvCandList[ merge_idx[ xCb ][ yCb ] ][ 1 ]          (8-978)
```

The drawings are created to explain a specific example of the present document. Since the name of the specific apparatus described in the drawings or the name of the specific signal/message/field is presented by way of example, the technical features of the present document are not limited to the specific name used in the drawings.

Figure 9:
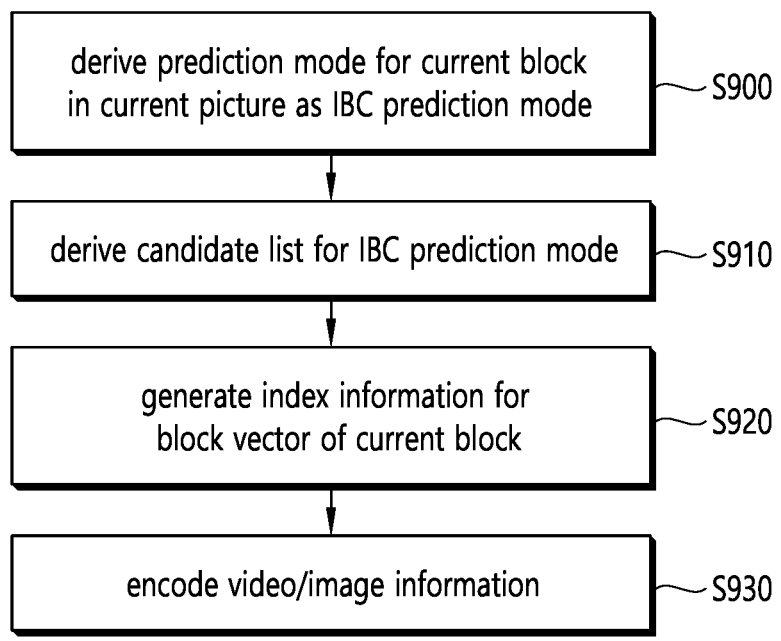
FIG. 9 and FIG. 10 schematically show an example of a video/image encoding method and related components according to embodiment(s) of the present document.
Figure 10:
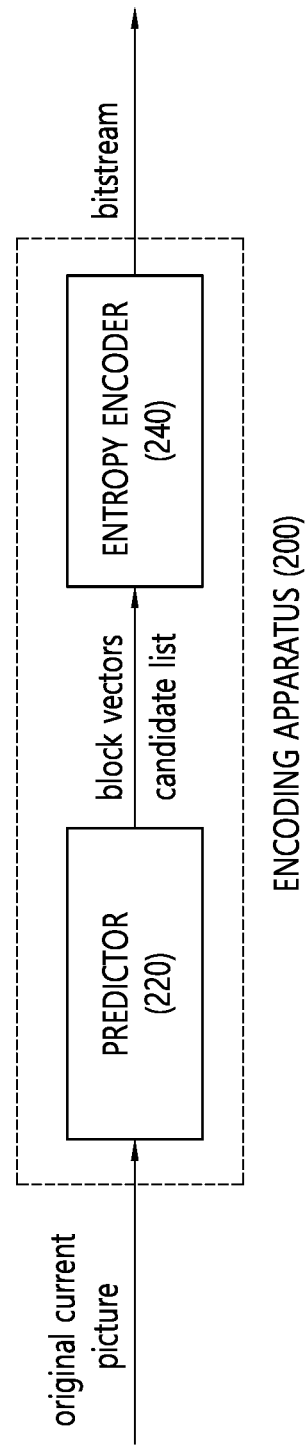

FIG. 9 and FIG. 10 schematically show an example of a video/image encoding method and related components according to embodiment(s) of the present document. The method disclosed in FIG. 9 may be performed by the encoding apparatus disclosed in FIG. 2. Specifically, for example, S900 and S910 of FIG. 9 may be performed by the predictor 220 of the encoding apparatus, and S920 and S930 of FIG. 9 may be performed by the entropy encoder 240 of the encoding apparatus. The method disclosed in FIG. 9 may include the embodiments described above in the present document.

Referring to FIG. 9, the encoding apparatus may derive the prediction mode for the current block in the current picture as the IBC prediction mode (S900). The IBC prediction mode may include an IBC merge mode, an IBC (A)MVP mode, an IBC HMVP mode, and an IBC pairwise average merge mode. In one example, the IBC prediction mode may be an IBC merge mode (merge mode for IBC).

The encoding apparatus may derive a candidate list for the IBC prediction mode (S910). The candidate list for the IBC prediction mode may include block vector candidates indicating a reference block in the current picture. In one example, the candidate list for the IBC prediction mode may be a merge candidate list for the IBC prediction mode. Table 12 described above shows mvL[0] and mvL[1] as exemplary candidate lists.

The encoding apparatus may generate index information indicating (representing, specifying) the block vector of the current block based on the candidate list for the IBC prediction mode (S920). For example, the index information may be merge_idx[xCb][yCb] included in Table 12 described above.

The encoding apparatus may encode video/image information (S930). The image/video information may include index information indicating a block vector of a current block. The information for generating the luma samples may include, for example, prediction related information (prediction mode information) and residual information. The prediction related information includes information on various prediction modes (i.e., merge mode of inter prediction, MVP mode of inter prediction, IBC prediction mode (IBC merge mode, IBC (A)MVP mode, IBC HMVP mode), etc.), MVD information, information on the candidate list, information on the maximum number of block vectors included in the candidate list for IBC prediction mode, information on the maximum number of block vectors included in the candidate list for IBC merge mode, inter prediction mode Information on the maximum number of block vectors included in the candidate list, information on the maximum number of motion vectors included in the candidate list for the merge mode of inter prediction, information on block vectors (motion vectors), etc. may be included. Also, the image information may include flag information (i.e., pred_mode_jbc_flag) indicating whether the IBC prediction mode is applied.

In one embodiment, the image information may include a sequence parameter set (SPS), and the SPS includes an IBC enabled flag specifying whether the IBC prediction mode is enabled. For example, when a value of the IBC enabled flag is 1, the information on the maximum number of the block vector candidates included in the candidate list for the IBC prediction mode may be generated.

In one embodiment, the maximum number of the block vector candidates included in the candidate list for the IBC prediction mode may be derived based on a difference between 6 and a value of information on the maximum number of the block vector candidates included in the candidate list for the IBC prediction mode. For example, the maximum number of the block vector candidates included in the candidate list for the IBC prediction mode may be derived based on the equation included in Table 3 (MaxNumibcMergeCand=6−six_minus_max_num_ibc_merge_cand). In the equation, MaxNumibcMergeCand may represent the maximum number of block vector candidates included in the candidate list for the IBC prediction mode, and six_minus_max_num_ibc_merge_cand may represent the value of information on the maximum number of the block vector candidates included in the candidate list for the IBC prediction mode.

In one embodiment, the image information may include information on a maximum number of motion vector candidates included in a candidate list for the inter prediction mode, and the information on the maximum number of block vector candidates included in the candidate list for the IBC prediction mode (ex. six_minus_max_num_merge_cand) may be different from the information on the maximum number of motion vector candidates included in the candidate list for the inter prediction mode (ex. six_minus_max_num_ibc_merge_cand).

In one embodiment, when a number of block vector candidates included in the candidate list for the IBC prediction mode is less than the maximum number and greater than 1, a derivation process of pairwise average merging candidates may be performed. Or, When a number of block vector candidates included in the candidate list for the IBC prediction mode is less than the maximum number (or maximum number−1, MaxNumMergeCand−1) and a number of history-based motion vector prediction (HMVP) candidates is greater than 0, a derivation process of history-based merge candidates may be performed.

The encoded image/video information may be output in the form of a bitstream. The bitstream may be transmitted to the decoding apparatus through a network or a (digital) storage medium.

The image information may include various information according to an embodiment of the present document. For example, the image information may include at least one information or at least one syntax element disclosed in at least one of Tables 1, 2, 4, 6, 8, and 10 described above.

In one example, the encoding apparatus may derive residual samples based on the prediction samples and the original samples. In this case, residual information may be derived based on the residual samples. Reconstructed samples may be generated based on the residual information. A reconstructed block and a reconstructed picture may be derived based on the reconstructed samples.

Figure 11:
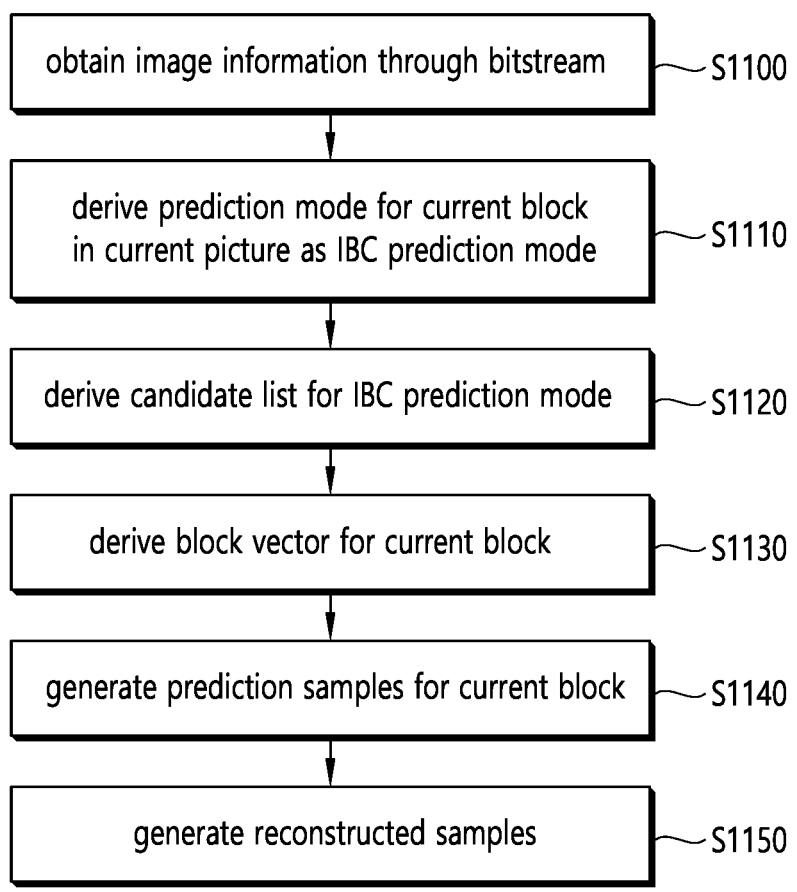
FIG. 11 and FIG. 12 schematically show an example of an image/video decoding method and related components according to an embodiment of the present document.
Figure 12:
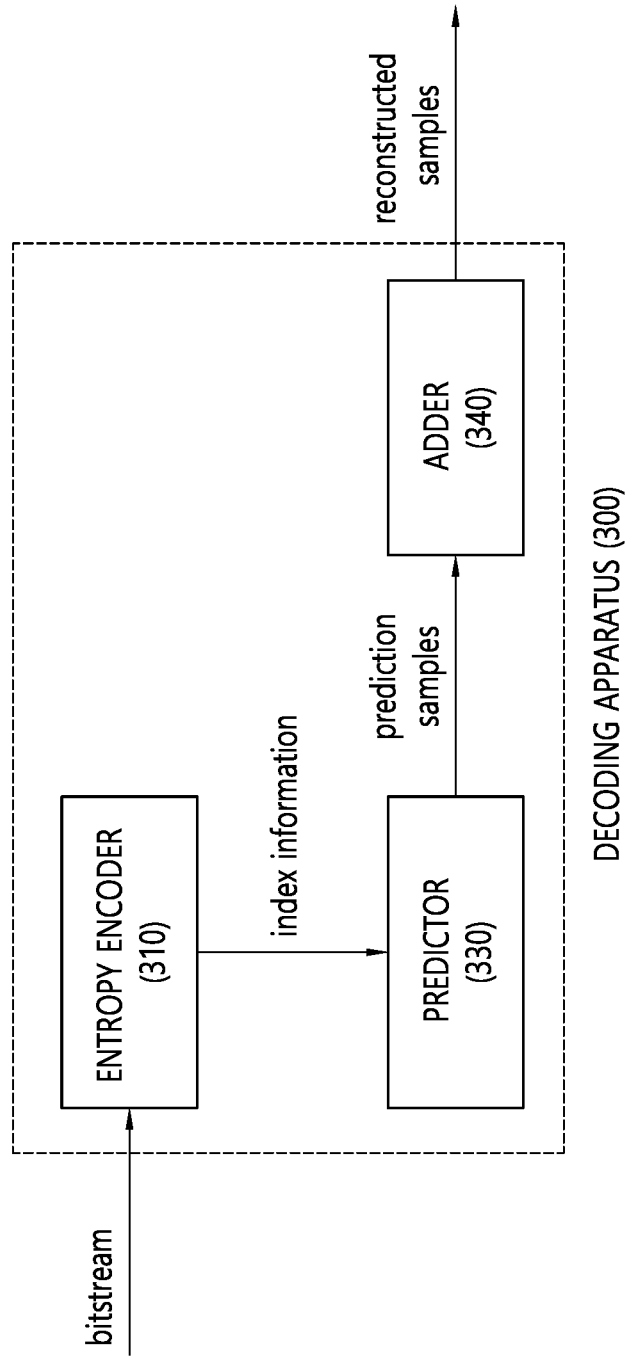

FIG. 11 and FIG. 12 schematically show an example of an image/video decoding method and related components according to an embodiment of the present document. The method disclosed in FIG. 11 may be performed by the decoding apparatus illustrated in FIG. 3. Specifically, for example, S1100 of FIG. 11 may be performed by the entropy decoder 310 of the decoding apparatus, S1110 to S1140 may be performed by the predictor 330 of the decoding apparatus, and S1150 may be performed by the adder 340 of the decoding apparatus. The method disclosed in FIG. 11 may include the embodiments described above in the present document.

Referring to FIG. 11, the decoding apparatus may receive/obtain image/video information. For example, the decoding apparatus may receive/obtain the image/video information through a bitstream. The decoding apparatus may obtain index information for deriving a block vector through a bitstream (S1100). For example, the index information may be merge_idx[xCb][yCb] included in Table 12 described above. In addition, the decoding apparatus may further obtain flag information (i.e., pred_mode_jbc_flag), indicating whether the IBC prediction mode is applied, through the bitstream.

The image/video information may include various information according to an embodiment of the present document. For example, the image/video information may include information disclosed in at least one of Tables 1, 2, 4, 6, 8, and 10 described above.

The decoding apparatus may derive the prediction mode for the current block in the current picture as the IBC prediction mode (S1110). The IBC prediction mode may include an IBC merge mode, an IBC (A)MVP mode, an IBC HMVP mode, and an IBC pairwise average merge mode. In one example, the IBC prediction mode may be an IBC merge mode (merge mode for IBC).

The decoding apparatus may derive a candidate list for the IBC prediction mode (S1120). The candidate list for the IBC prediction mode may include block vector candidates indicating a reference block in the current picture. In one example, the candidate list for the IBC prediction mode may be a merge candidate list for the IBC prediction mode. Table 12 described above shows mvL[0] and mvL[1] as exemplary candidate lists.

The decoding apparatus may derive a block vector for the current block based on the candidate list for the IBC prediction mode and the index information (S1130).

The decoding apparatus may generate prediction samples of the current block based on the block vector (S1140). Prediction samples for the current block may be generated based on reference samples in the reference block indicated by the block vector. Here, the reference block may be included in the current picture.

The decoding apparatus may generate reconstructed samples based on the prediction samples (S1150). The decoding apparatus may obtain residual information from the image information and may derive residual samples based on the residual information. The decoding apparatus may generate (derive) reconstructed samples based on the residual samples and the prediction samples. For example, the decoding apparatus may generate (derive) reconstructed samples by adding residual samples to the prediction samples.

In one embodiment, the image information may include a sequence parameter set (SPS), and the SPS includes an IBC enabled flag specifying whether the IBC prediction mode is enabled. For example, when a value of the IBC enabled flag is 1, the information on the maximum number of the block vector candidates included in the candidate list for the IBC prediction mode may be signaled/parsed.

In one embodiment, the maximum number of the block vector candidates included in the candidate list for the IBC prediction mode may be derived based on a difference between 6 and a value of information on the maximum number of the block vector candidates included in the candidate list for the IBC prediction mode. For example, the maximum number of the block vector candidates included in the candidate list for the IBC prediction mode may be derived based on the equation included in Table 3 (MaxNumibcMergeCand=6−six_minus_max_num_ibc_merge_cand). In the equation, MaxNumibcMergeCand may represent the maximum number of block vector candidates included in the candidate list for the IBC prediction mode, and six_minus_max_num_ibc_merge_cand may represent the value of information on the maximum number of the block vector candidates included in the candidate list for the IBC prediction mode.

In one embodiment, the image information may include information on a maximum number of motion vector candidates included in a candidate list for the inter prediction mode, and the information on the maximum number of block vector candidates included in the candidate list for the IBC prediction mode (ex. six_minus_max_num_merge_cand) may be different from the information on the maximum number of motion vector candidates included in the candidate list for the inter prediction mode (ex. six_minus_max_num_ibc_merge_cand).

In one embodiment, when a number of block vector candidates included in the candidate list for the IBC prediction mode is less than the maximum number and greater than 1, a derivation process of pairwise average merging candidates may be performed. Or, When a number of block vector candidates included in the candidate list for the IBC prediction mode is less than the maximum number (or maximum number−1, MaxNumMergeCand−1) and a number of history-based motion vector prediction (HMVP) candidates is greater than 0, a derivation process of history-based merge candidates may be performed.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The method according to the above-described embodiments of the present document may be implemented in software form, and the encoding apparatus and/or decoding apparatus according to the present document is, for example, may be included in the apparatus that performs the image processing of a TV, a computer, a smart phone, a set-top box, a display device, etc.

When the embodiments in the present document are implemented in software, the above-described method may be implemented as a module (process, function, etc.) that performs the above-described function. A module may be stored in a memory and executed by a processor. The memory may be internal or external to the processor, and may be coupled to the processor by various well-known means. The processor may include an application-specific integrated circuit (ASIC), other chipsets, logic circuits, and/or data processing devices. Memory may include read-only memory (ROM), random access memory (RAM), flash memory, memory cards, storage media, and/or other storage devices. That is, the embodiments described in the present document may be implemented and performed on a processor, a microprocessor, a controller, or a chip. For example, the functional units shown in each figure may be implemented and performed on a computer, a processor, a microprocessor, a controller, or a chip. In this case, information on instructions or an algorithm for implementation may be stored in a digital storage medium.

In addition, the decoding apparatus and the encoding apparatus to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VoD service providing apparatus, an Over the top (OTT) video apparatus, an Internet streaming service providing apparatus, a three-dimensional (3D) video apparatus, a teleconference video apparatus, a transportation user equipment (i.e., vehicle user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the present document is applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (i.e., transmission through the Internet). In addition, a bitstream generated by the encoding method may be stored in a computer-readable recording medium or may be transmitted over wired/wireless communication networks.

In addition, the embodiments of the present document may be implemented with a computer program product according to program codes, and the program codes may be performed in a computer by the embodiments of the present document. The program codes may be stored on a carrier which is readable by a computer.

Figure 13:
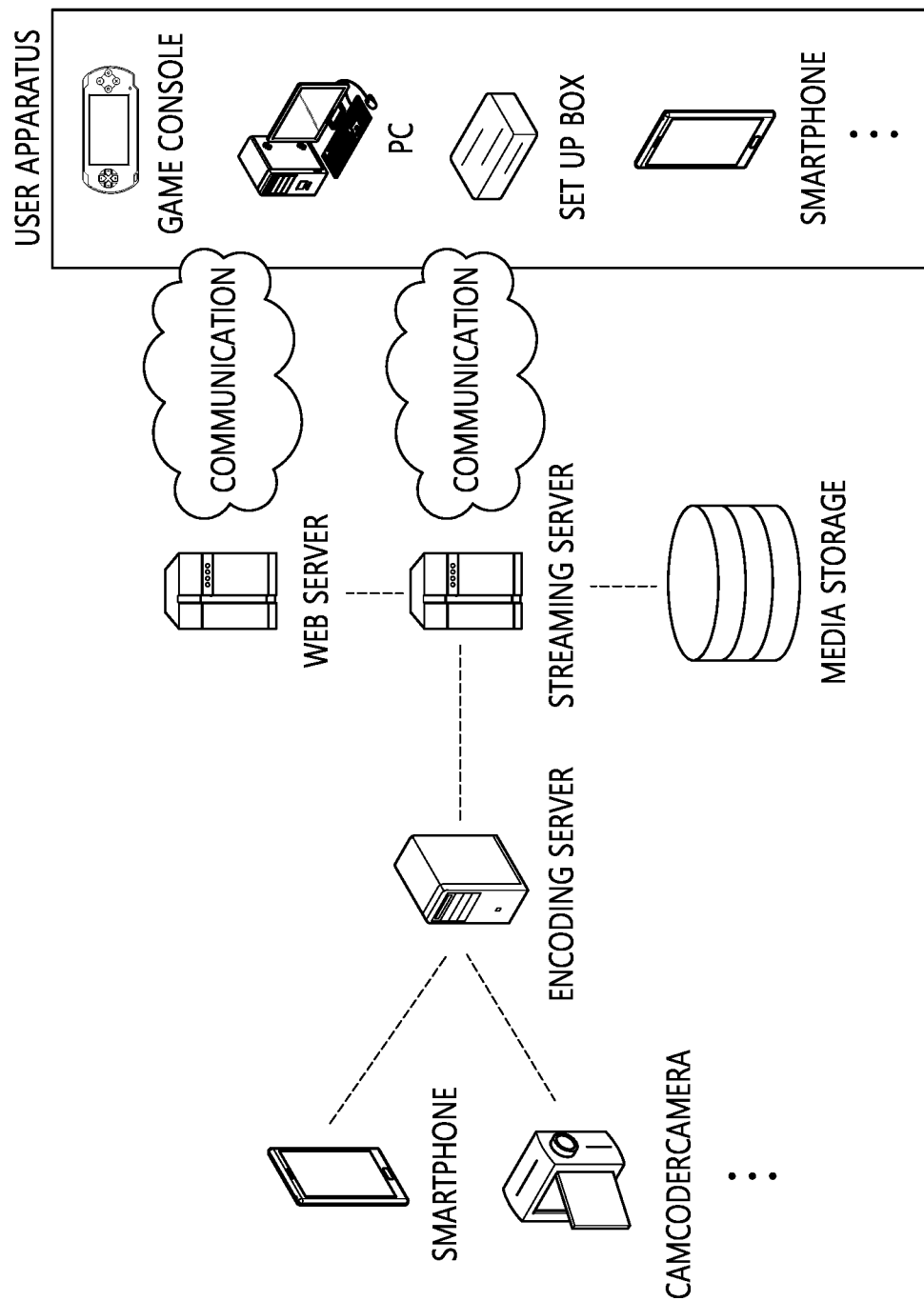
FIG. 13 shows an example of a content streaming system to which embodiments disclosed in the present document may be applied.

FIG. 13 shows an example of a content streaming system to which embodiments disclosed in the present document may be applied.

Referring to FIG. 13, the content streaming system to which the embodiment(s) of the present document is applied may largely include an encoding server, a streaming server, a web server, a media storage, a user device, and a multimedia input device.

The encoding server compresses content input from multimedia input devices such as a smartphone, a camera, a camcorder, etc. Into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. Smartwatches, smart glasses, head mounted displays), digital TVs, desktops computer, digital signage, and the like. Each server in the content streaming system may be operated as a distributed server, in which case data received from each server may be distributed.

Each server in the content streaming system may be operated as a distributed server, and in this case, data received from each server may be distributed and processed.

The claims described herein may be combined in various ways. For example, the technical features of the method claims of the present document may be combined and implemented as an apparatus, and the technical features of the apparatus claims of the present document may be combined and implemented as a method. In addition, the technical features of the method claim of the present document and the technical features of the apparatus claim may be combined to be implemented as an apparatus, and the technical features of the method claim of the present document and the technical features of the apparatus claim may be combined and implemented as a method.

What is claimed is:

1. An image decoding method performed by a decoding apparatus, the method comprising:
   obtaining image information including index information for deriving a block vector through bitstream;
   deriving a prediction mode for a current block in a current picture as an intra block copy (IBC) prediction mode;
   deriving a candidate list for the IBC prediction mode based on the image information, wherein the candidate list includes block vector candidates for a reference block in the current picture;
   deriving the block vector for the current block based on the candidate list for the IBC prediction mode and the index information;
   generating prediction samples of the current block based on the block vector; and
   generating reconstructed samples based on the prediction samples,
   wherein the image information comprises information on a maximum number of the block vector candidates included in the candidate list for the IBC prediction mode and information on a maximum number of motion vector candidates included in a candidate list for an inter prediction mode,
   wherein the information on the maximum number of the block vector candidates included in the candidate list for the IBC prediction mode is different from the information on the maximum number of the motion vector candidates included in the candidate list for the inter prediction mode,
   wherein the information on the maximum number of the block vector candidates included in the candidate list for the IBC prediction mode is obtained independently of a slice type, and
   wherein the information on the maximum number of the block vector candidates included in the candidate list for the IBC prediction mode is obtained based only on whether the IBC prediction mode is enabled.

2. The method of claim 1, wherein the image information includes a sequence parameter set (SPS), and
   wherein the SPS includes an IBC enabled flag specifying whether the IBC prediction mode is enabled.

3. The method of claim 2, wherein based on a value of the IBC enabled flag being 1, information on the maximum number of the block vector candidates included in the candidate list for the IBC prediction mode is signaled.

4. The method of claim 1, wherein the maximum number of the block vector candidates included in the candidate list for the IBC prediction mode is derived based on a difference between 6 and a value of information on the maximum number of the block vector candidates included in the candidate list for the IBC prediction mode.

5. The method of claim 4, wherein the maximum number of the block vector candidates included in the candidate list for the IBC prediction mode is derived based on the following equation, MaxNumibcMergeCand=6-six_minus_max_num_ibc_merge_cand herein MaxNumibcMergeCand represents the maximum number of the block vector candidates included in the candidate list for the IBC prediction mode, and six_minus_max_num_ibc_merge_cand represents the value of information on the maximum number of the block vector candidates included in the candidate list for the IBC prediction mode.

6. The method of claim 1, wherein based on a case that a number of block vector candidates included in the candidate list for the IBC prediction mode is less than the maximum number and greater than 1, a derivation process of pairwise average merging candidates is performed.

7. The method of claim 1, wherein based on a case that a number of block vector candidates included in the candidate list for the IBC prediction mode is less than the maximum number and a number of history-based motion vector prediction (HMVP) candidates is greater than 0, a derivation process of history-based merge candidates is performed.

8. An image encoding method performed by an encoding apparatus, the method comprising:
   deriving a prediction mode for a current block in a current picture as an intra block copy (IBC) prediction mode;
   deriving a candidate list for the IBC prediction mode, wherein the candidate list includes block vector candidates for a reference block in the current picture;
   generating index information for a block vector of the current block based on the candidate list for the IBC prediction mode; and
   encoding image information including the index information,
   wherein the image information comprises information on a maximum number of the block vector candidates included in the candidate list for the IBC prediction mode and information on a maximum number of motion vector candidates included in a candidate list for an inter prediction mode,
   wherein the information on the maximum number of the block vector candidates included in the candidate list for the IBC prediction mode is different from the information on the maximum number of the motion vector candidates included in the candidate list for the inter prediction mode,
   wherein the information on the maximum number of the block vector candidates included in the candidate list for the IBC prediction mode is encoded independently of a slice type, and
   wherein the information on the maximum number of the block vector candidates included in the candidate list for the IBC prediction mode is encoded based only on whether the IBC prediction mode is enabled.

9. The method of claim 8, wherein the image information includes a sequence parameter set (SPS), and
   wherein the SPS includes an IBC enabled flag specifying whether the IBC prediction mode is enabled.

10. The method of claim 9, wherein based on a value of the IBC enabled flag being 1, information on the maximum number of the block vector candidates included in the candidate list for the IBC prediction mode is generated.

11. The method of claim 8, wherein the maximum number of the block vector candidates included in the candidate list for the IBC prediction mode is derived based on a difference between 6 and a value of information on the maximum number of the block vector candidates included in the candidate list for the IBC prediction mode.

12. The method of claim 11, wherein the maximum number of the block vector candidates included in the candidate list for the IBC prediction mode is derived based on the following equation, MaxNumibcMergeCand=6-six_minus_max_num_ibc_merge_cand herein MaxNumibcMergeCand represents the maximum number of the block vector candidates included in the candidate list for the IBC prediction mode, and six_minus_max_num_ibc_merge_cand represents the value of information on the maximum number of the block vector candidates included in the candidate list for the IBC prediction mode.

13. The method of claim 8, wherein based on a case that a number of block vector candidates included in the candidate list for the IBC prediction mode is less than the maximum number and greater than 1, a derivation process of pairwise average merging candidates is performed.

14. The method of claim 8, wherein based on a case that a number of block vector candidates included in the candidate list for the IBC prediction mode is less than the maximum number and a number of history-based motion vector prediction (HMVP) candidates is greater than 0, a derivation process of history-based merge candidates is performed.

15. A non-transitory computer-readable digital storage medium, storing bitstream of image information generated by a method, the method comprising:

deriving a prediction mode for a current block in a current picture as an intra block copy (IBC) prediction mode;

deriving a candidate list for the IBC prediction mode, wherein the candidate list includes block vector candidates for a reference block in the current picture;

generating index information for a block vector of the current block based on the candidate list for the IBC prediction mode; and encoding image information including the index information, wherein the image information comprises information on a maximum number of the block vector candidates included in the candidate list for the IBC prediction mode and information on a maximum number of motion vector candidates included in a candidate list for an inter prediction mode, wherein the information on the maximum number of the block vector candidates included in the candidate list for the IBC prediction mode is different from the information on the maximum number of the motion vector candidates included in the candidate list for the inter prediction mode, wherein the information on the maximum number of the block vector candidates included in the candidate list for the IBC prediction mode is encoded independently of a slice type, and wherein the information on the maximum number of the block vector candidates included in the candidate list for the IBC prediction mode is encoded based only on whether the IBC prediction mode is enabled.

* * * * *